United States Patent
Sun et al.

(10) Patent No.: US 11,657,562 B2
(45) Date of Patent: May 23, 2023

(54) UTILIZING HEMISPHERICAL CLAMPING FOR IMPORTANCE SAMPLING OF IMAGE-BASED LIGHT TO RENDER A VIRTUAL ENVIRONMENT

(71) Applicant: Adobe Inc., San Jose, CA (US)

(72) Inventors: Xin Sun, Sunnyvale, CA (US); Milos Hasan, Oakland, CA (US); Nathan Carr, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/233,910

(22) Filed: Apr. 19, 2021

(65) Prior Publication Data

US 2022/0335677 A1 Oct. 20, 2022

(51) Int. Cl.
*G06T 15/06* (2011.01)
*G06T 7/536* (2017.01)
*G06T 15/00* (2011.01)
*G06T 1/20* (2006.01)
*G06T 7/507* (2017.01)

(52) U.S. Cl.
CPC ........... *G06T 15/06* (2013.01); *G06T 1/20* (2013.01); *G06T 7/507* (2017.01); *G06T 7/536* (2017.01); *G06T 15/005* (2013.01)

(58) Field of Classification Search
CPC ....... G06T 15/06; G06T 15/005; G06T 7/507; G06T 7/536; G06T 1/20
See application file for complete search history.

(56) References Cited

U.S. PATENT DOCUMENTS

2008/0024523 A1* 1/2008 Tomite ................. G06T 19/006
345/632
2012/0105450 A1* 5/2012 Sourimant ............ G06T 15/50
345/421

(Continued)

OTHER PUBLICATIONS

Alhakamy et al. ("Real-time Illumination and Visual Coherence for Photorealistic Augmented/Mixed Reality" ACM Computing Surveys (CSUR), 2020) (Year: 2020).*

(Continued)

*Primary Examiner* — Sing-Wai Wu
*Assistant Examiner* — Khoa Vu
(74) *Attorney, Agent, or Firm* — Keller Preece PLLC

(57) ABSTRACT

The present disclosure relates to systems, non-transitory computer-readable media, and methods that utilize hemispherical clamping for importance sampling of an image-based light (IBL) to generate a digital image of a virtual environment. For example, the disclosed systems identify a hemispherical portion of an IBL image that corresponds to a reflective surface location on a virtual object. The disclosed systems can then clamp the IBL image using one or more importance sampling algorithms to exclude portions of the IBL image outside of the hemispherical portion that do not contribute direct lighting onto the reflective surface location. The disclosed systems can further utilize the one or more importance sampling algorithms to efficiently sample a ray direction between the reflective surface location and the hemispherical portion of the IBL image. In certain embodiments, the disclosed systems use the sampled ray direction to generate a digital image rendering portraying the virtual object.

20 Claims, 10 Drawing Sheets

(56) References Cited

U.S. PATENT DOCUMENTS

| | | | | |
|---|---|---|---|---|
| 2017/0236325 A1* | 8/2017 | Lecocq | ............ | G06T 15/55 345/426 |
| 2019/0272626 A1* | 9/2019 | Rhee | ............ | G06T 15/20 |
| 2022/0309745 A1* | 9/2022 | Bigos | ............ | G06T 15/80 |

OTHER PUBLICATIONS

Colbert et al. ("GPU-Based Importance Sampling", NVIDIA Developer, 2007). (Year: 2007).*

Joel Kronander ("Physically based rendering of synthetic objects in real environments" Linkoping University, Dec. 2015). (Year: 2015).*

Alexander Keller, Carsten Wächter, Matthias Raab, Daniel Seibert, Dietger van Antwerpen, Johann Korndörfer, and Lutz Kettner. 2017. The Iray Light Transport Simulation and Rendering System. In ACM SIGGRAPH 2017 Talks (SIGGRAPH '17). Association for Computing Machinery, New York, NY, USA, Article 34, 2 pages, https://doi.org/10.1145/3084363.3085050.

Merlin Nimier-David, Delio Vicini, Tizian Zeltner, and Wenzel Jakob. 2019. Mitsuba 2: A Retargetable Forward and Inverse Renderer. ACM Trans. Graph. 38, 6, Article 203 (Nov. 2019), 17 pages. https://doi.org/10.1145/3355089.3356498.

Matt Pharr, Wenzel Jakob, and Greg Humphreys. 2016. Physically Based Rendering: From Theory to Implementation (3rd ed.). Morgan Kaufmann Publishers Inc., San Francisco, CA, USA.

Paul Debevec. 1998. Rendering Synthetic Objects into Real Scenes: Bridging Traditional and Image-Based Graphics with Global Illumination and High Dynamic Range Photography. In Proceedings of the 25th Annual Conference on Computer Graphics and Interactive Techniques (SIGGRAPH '98). Association for Computing Machinery, New York, NY, USA, 189-198. https://doi.org/10.1145/280814.280864.

James T. Kajiya. 1986. The Rendering Equation. SIGGRAPH Comput. Graph. 20, 4 (Aug. 1986), 143-150. https://doi.org/10.1145/15886.15902.

Michael Oren and Shree K. Nayar. 1994. Generalization of Lambert's Reflectance Model. In Proceedings of the 21st Annual Conference on Computer Graphics and Interactive Techniques (SIGGRAPH '94). Association for Computing Machinery, New York, NY, USA, 239-246. https://doi.org/10.1145/192161.192213.

Eric Veach. 1998. Robust Monte Carlo Methods for Light Transport Simulation. Ph.D. Dissertation.Stanford,CA,USA. Advisor(s)Guibas,LeonidasJ. AAI9837162.

Bruce Walter, Stephen R. Marschner, Hongsong Li, and Kenneth E. Torrance. 2007. Microfacet Models for Refraction through Rough Surfaces. In Proceedings of the 18th Eurographics Conference on Rendering Techniques (EGSR'07). Eurographics Association, Goslar, DEU, 195-206.

IBL sampling in Mitsuba 2; GitHub; Date downloaded May 19, 2021; https://github.com/mitsuba-renderer/mitsuba2/blob/master/src/emitters/envmap.cpp.

IBL sampling in PBRT 2; GitHub; Date downloaded May 19, 2021; https://github.com/mmp/pbrt-v2/blob/master/src/lights/infinite.h.

* cited by examiner

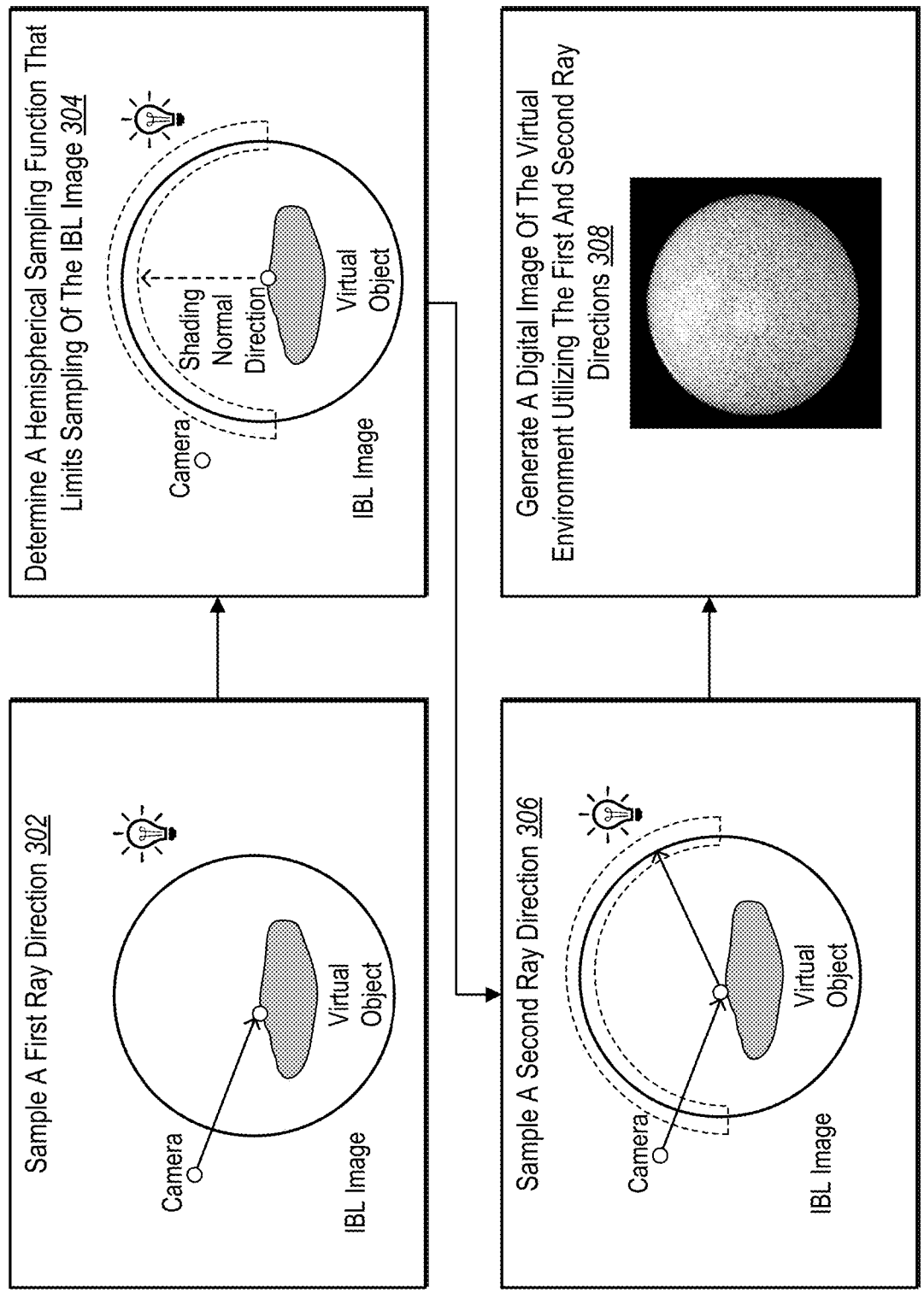

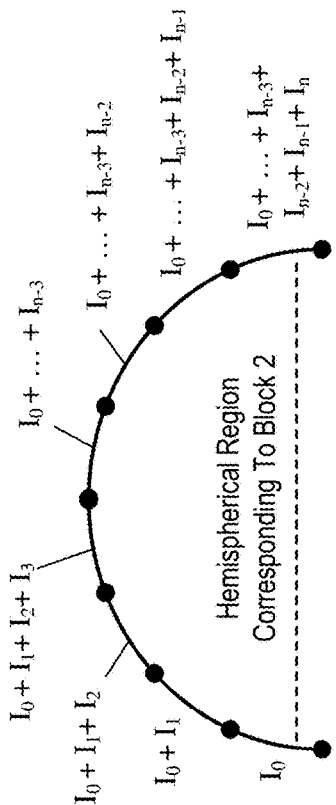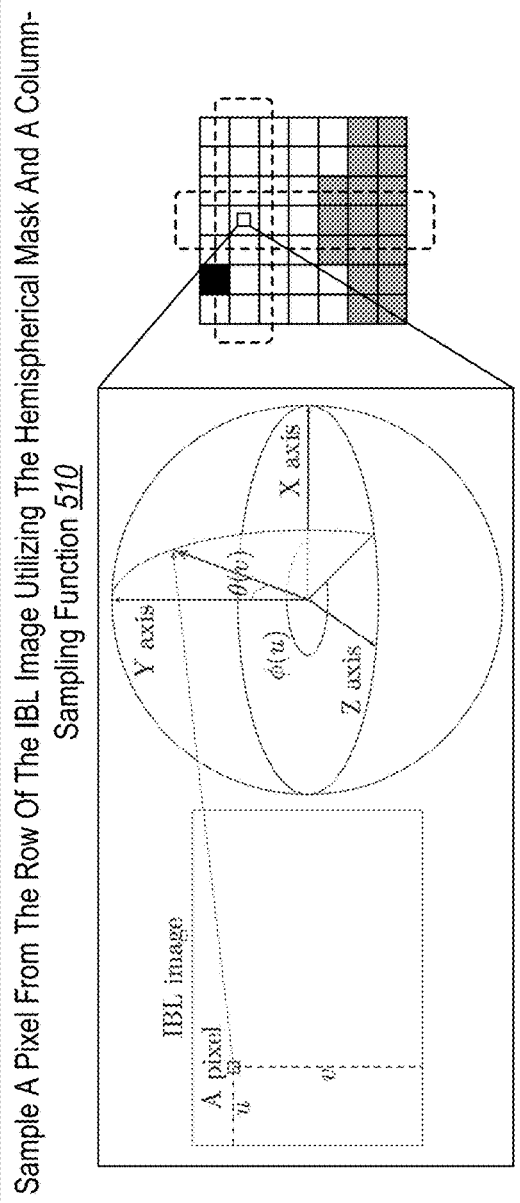
Fig. 5B

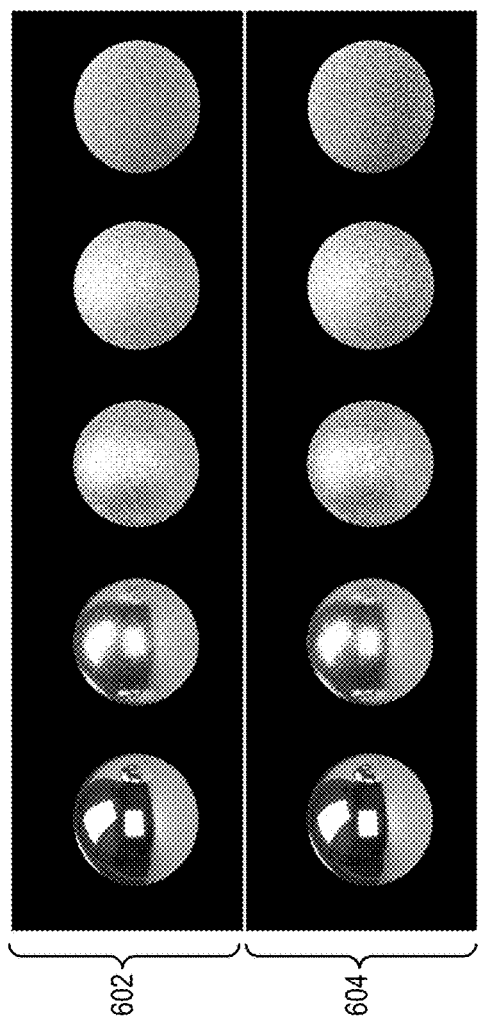
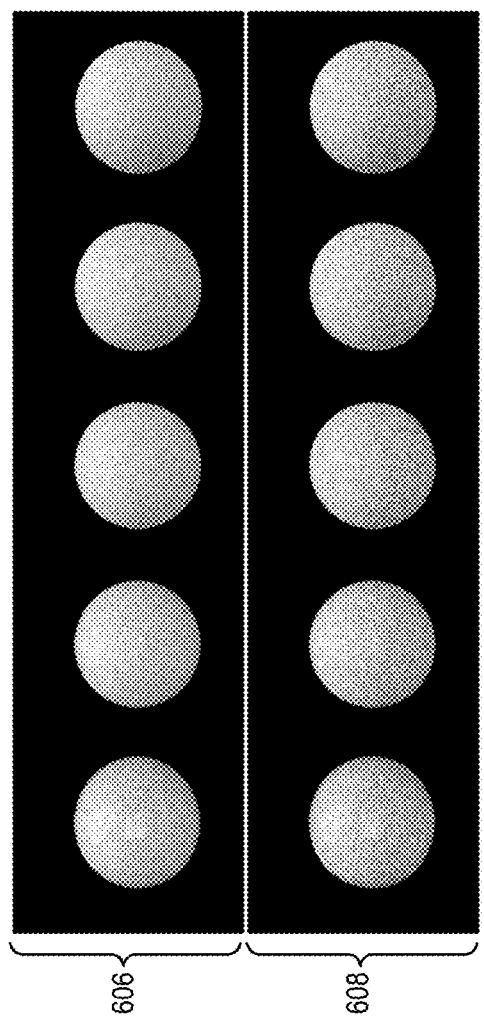

UTILIZING HEMISPHERICAL CLAMPING FOR IMPORTANCE SAMPLING OF IMAGE-BASED LIGHT TO RENDER A VIRTUAL ENVIRONMENT

BACKGROUND

Recent years have seen rapid development in digital image rendering technology. Indeed, due to advances in algorithms and hardware, conventional digital rendering systems are now able to generate high quality, photo-realistic digital images in relation to a variety of virtual environments. For example, existing systems can generate digital images of virtual environments in the context of video games, construction modeling, movies, advertising, or entertainment. Unfortunately, a number of problems exist with conventional digital rendering systems that lead to inefficient and/or increased sampling iterations and slower speeds in generating accurate renderings of lighting effects.

BRIEF SUMMARY

Embodiments of the present disclosure provide benefits and/or solve one or more of the foregoing or other problems in the art with systems, non-transitory computer-readable media, and methods that utilize hemispherical clamping for Monte Carlo importance sampling of an image-based light (or an "IBL image") to generate a digital representation of a virtual environment. In particular, the disclosed systems can utilize a hemispherical clamping approach to sample an IBL image for direct lighting on reflective surfaces. In one or more embodiments, the disclosed system optimizes the sampling by excluding nearly half of the IBL image located on the back side of the shading surface relative to the pertinent light source. In this manner, the disclosed systems can utilize importance sampling to generate an accurate visual representation of a virtual environment while improving the speed and efficiency of implementation computing systems.

For example, in some embodiments, the disclosed systems execute Monte Carlo importance sampling by shooting a ray, such as a camera ray (e.g., a primary ray) or another ray, that intersects a reflective surface location of a virtual object. The disclosed systems identify a hemispherical portion of the IBL image that corresponds to a shading normal direction of the reflective surface location. The disclosed systems then clamp the IBL image using an importance sampling algorithm that excludes approximately half of the IBL image. In one or more embodiments, the disclosed systems utilize the importance sampling algorithm to efficiently sample a shadow ray (e.g., direct lighting) between the reflective surface location and the isolated hemispherical portion of the IBL image. In certain embodiments, the disclosed systems then use the camera ray and the shadow ray to generate a digital image (e.g., a rendering) of the virtual object within the virtual environment.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 3 illustrates a hemispherical clamping system utilizing a hemispherical sampling function to generate a digital image in accordance with one or more embodiments.

FIGS. 5A-5B illustrate a hemispherical clamping system accessing a normal sampling database to sample a pixel of an IBL image in accordance with one or more embodiments.

FIGS. 6A-6B illustrate experimental results of implementing a hemispherical clamping system in accordance with one or more embodiments.

DETAILED DESCRIPTION

Figure 1:
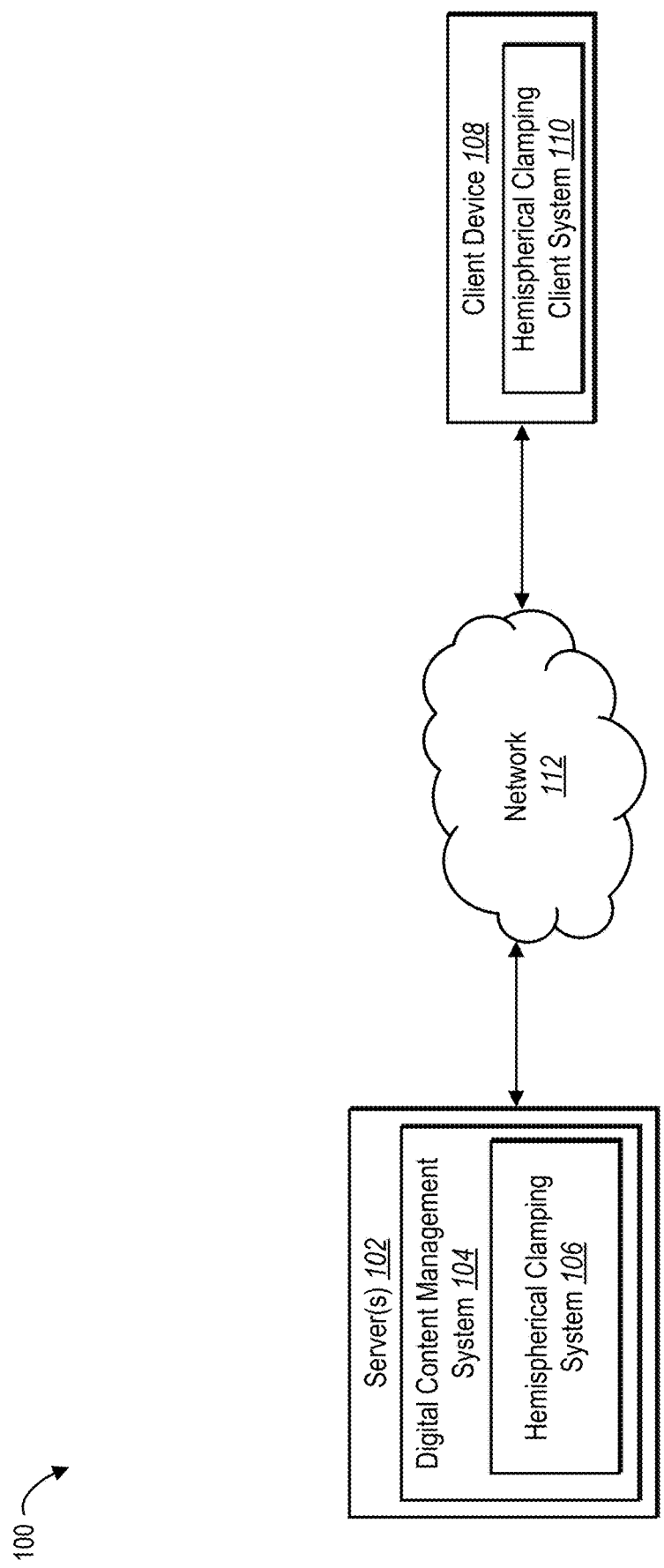
FIG. 1 illustrates a computing system environment for implementing a hemispherical clamping system in accordance with one or more embodiments.

One or more embodiments described herein include a hemispherical clamping system that efficiently limits digital sampling of an image-based light (or "IBL image") to efficiently and accurately generate a digital representation of a virtual environment. In particular, the hemispherical clamping system can isolate half of the IBL image with respect to a shading normal of one or more objects within the virtual environment. Specifically, in one or more embodiments, the hemispherical clamping system samples from only half of the IBL image on the same side of any particular surface of a sampling path. Accordingly, the hemispherical clamping system can double a probability (on average) of sampling a light path with throughput, significantly reducing the variance of each light path sample. Accordingly, the hemispherical clamping system can significantly improve convergence, efficiency, speed and accuracy of implementing computer systems.

To illustrate, in some embodiments, the hemispherical clamping system subdivides the IBL image into a plurality of blocks (e.g., regions). Each block of the IBL image corresponds to a unique hemispherical sampling function that limits sampling of the IBL image to a particular hemispherical region. Accordingly, in one or more embodiments, the hemispherical clamping system utilizes a shading normal direction for a surface point of the virtual object to identify a corresponding block of the IBL image. The hemispherical clamping system accesses a predetermined normal sampling database to identify a hemispherical sampling function for the block of the IBL image. The hemispherical clamping system then uses the hemispherical sampling function to sample a pixel from the IBL image within the hemispherical region. For instance, the hemispherical clamping system samples a full light path from a camera perspective, to the surface point, and subsequently to the identified pixel of the IBL image in order to generate a digital rendering of the virtual object.

As alluded to above, in some embodiments the hemispherical clamping system generates a pre-computed normal sampling database that it accesses during runtime to efficiently render a virtual scene. For example, prior to rendering, the hemispherical clamping system generates the normal sampling database by dividing an IBL image into a plurality of blocks. In certain implementations, the hemispherical clamping system generates the normal sampling database by assigning or indexing block-specific data. For example, the hemispherical clamping system determines, for each block, a range of corresponding shading normal directions for the virtual object. Moreover, the hemispherical clamping system determines, for each block, a corresponding hemispherical sampling function that limits sampling to a particular hemispherical region.

In certain embodiments, the hemispherical clamping system generates the normal sampling database by populating a data table or array composed of combinations of hemispherical sampling functions. For example, the hemispherical clamping system generates hemispherical masks that identify, for each block, other blocks of the IBL image included in a corresponding hemispherical region. In particular embodiments, each block corresponds to a unique probability distribution (e.g., a singular, block-specific distribution function) that covers a specific hemispherical region. Based on the probability distribution for a given block, one or more embodiments of the hemispherical clamping system can directly sample a discrete pixel of the IBL image.

Additionally or alternatively, the hemispherical clamping system generates hemispherical sampling functions that include multiple probability distributions, such as row-sampling functions and column-sampling functions. To illustrate, the hemispherical clamping system generates row sampling functions comprising probability distributions for importance sampling particular pixel rows of the IBL image given a particular block/shading normal direction. Similarly, the hemispherical clamping system can generate column sampling functions comprising probability distributions for importance sampling of particular columns of pixels of the IBL image (e.g., given a particular row of pixels). The hemispherical clamping system can apply the hemispherical mask, row sampling function, and column sampling function to identify a pixel at a spherical coordinate to sample from the IBL image. By generating a normal sampling database reflecting a hemispherical sampling function, the hemispherical clamping system can efficiently store and access digital information to execute importance sampling at run time for rendering a virtual scene.

To illustrate, at run time, the hemispherical clamping system determines a block and corresponding sampling function in the normal sampling database. Specifically, in particular embodiments, the hemispherical clamping system samples a first ray direction intersecting a surface point of a virtual object to identify a shading normal direction for the surface point. Using this shading normal direction, one or more embodiments of the hemispherical clamping system identify a corresponding block of the IBL image and then utilizes the normal sampling database to identify the hemispherical sampling function that corresponds to the block.

To illustrate, based on the identified block, the hemispherical clamping system selects and applies a hemispherical mask to the IBL image (to exclude sampling pixels of particular blocks that do not correspond to the hemispherical region). In addition to the hemispherical mask, in one or more embodiments the hemispherical clamping system utilize a row-sampling function and column-sampling function to select a particular pixel.

In other embodiments, the hemispherical sampling functions do not necessarily include row-sampling functions and/or column-sampling functions. For example, as described above, certain embodiments of the normal sampling database comprise a unique distribution function corresponding to each block. Based on a given distribution function, one or more embodiments of the hemispherical clamping system then use the given distribution function to directly sample a particular pixel within a specific hemispherical region.

Indeed, by utilizing one or more hemispherical sampling functions, the hemispherical clamping system can prioritize pixel sampling from areas of greater incidental directional radiance within a particular row and column of the blocks of the hemispherical region. Accordingly, in one or more embodiments, the hemispherical clamping system samples a second ray direction between the surface point of the virtual object utilizing a hemispherical sampling function (e.g., utilizing a particular hemispherical mask, row-sampling function, and column sampling function corresponding to a particular block).

In some embodiments, the hemispherical clamping system generates a digital image of the virtual environment. For example, the hemispherical clamping system renders a camera ray and a shadow ray following a light path between the camera perspective and the IBL image along the first ray direction, the surface point on the virtual object and the second ray direction.

Additionally, in one or more embodiments, the hemispherical clamping system renders the digital image of the virtual environment by repeating the foregoing process for additional surface points of the virtual object. For instance, the hemispherical clamping system utilizes a different shading normal direction for an additional surface point to determine a different block and corresponding hemispherical sampling function according to the normal sampling database. In turn, the hemispherical clamping system applies the hemispherical sampling function to limit sampling of the IBL image to a different hemispherical region corresponding to the additional surface point of the virtual object. In certain embodiments, the hemispherical clamping system subsequently renders a camera ray and a shadow ray for a light path between the camera perspective, the additional surface point, and an additional pixel of the IBL image that corresponds to the different hemispherical region. By iteratively sampling light paths, the hemispherical clamping system can efficiently and accurately render the entire virtual scene.

The hemispherical clamping system can importance sample lighting to a point on a surface with respect an IBL-image and can do so with respect to a variety of different sampling, casting, or rendering approaches. For example, although many of the example embodiments discussed in this disclosure involve two rays (one ray between a camera perspective and a surface point and another ray between the surface paint and the IBL image), the hemispherical claiming system can operate with a different number of rays (e.g., 3 or 5 rays within a light path) and in a variety of different directions, orders, or sequences (e.g., originating from the camera perspective, originating from the IBL-image, through single direction sampling, or through bi-directional sampling). Indeed, in some implementations, ray paths may split to form a tree of ray paths. Thus, the hemispherical clamping system can sample ray directions utilizing a variety of Monte Carlo rendering algorithms such as path tracing, bidirectional path tracing, metropolis light transport, etc. Moreover, the terms "first" and "second" when referring to rays or ray directions do not require or imply a particular casting sequence or order. Rather, "first" and "second" refer to two distinct rays or ray directions.

As mentioned above, a number of problems exist with conventional digital rendering systems, particularly with regard to inefficient and/or increased sampling iterations and slower rendering speeds, in rendering lighting effects. For example, some conventional digital rendering systems utilize Monte Carlo sampling approaches with IBL images that are computationally expensive to operate. To illustrate, conventional importance sampling methods attempt to increase the probability of sampling light paths that have higher throughput for better Monte Carlo rendering. However, utilizing conventional importance sampling methods for guiding Monte Carlo rendering often results in wasted sampling iterations. For example, many conventional importance sampling methods place so much emphasis on sampling the brightest light source or region that conventional digital rendering systems sample inefficient and unhelpful light paths that do not contribute to direct lighting on a given reflective surface of a virtual object. To illustrate, a reflective surface from a camera viewpoint may not receive direct lighting from a particular light source positioned on the opposite side of the reflective surface. Nonetheless, if the particular light source is relatively bright, conventional importance sampling methods will erroneously (and repeatedly) sample from the bright light source.

As another example problem, conventional digital rendering systems suffer from slower rendering speeds. For example, due to the large amounts of variance, conventional digital rendering systems require a large volume of light samples in order to reach convergence. Often, the number of samples needed by conventional systems to reach convergence is excessive, dramatically increasing runtime speeds. To circumvent runtime issues and/or avoid system downtime, conventional digital rendering systems often utilize large and/or complex processors to handle the increased computational overhead. Accordingly, some conventional digital rendering systems are incompatible with certain computing devices having limited processing power or else cannot operate at full performance levels.

In contrast, the hemispherical clamping system can improve efficiency and convergence speed relative to conventional digital rendering systems without sacrificing accuracy or quality of resulting digital image renderings. For example, the hemispherical clamping system can clamp the IBL image to exclude sampling from a large portion (e.g., almost half) of the IBL image that does not contribute to the direct lighting throughput at specific surface points of a virtual object. In addition, the hemispherical clamping system can efficiently store and utilize a normal sampling database to identify and retrieve hemispherical sampling functions at run time. Therefore, the hemispherical clamping system can improve rendering efficiency by almost doubling the probability of sampling a light path with significant throughput.

In addition to improved efficiency, the hemispherical clamping system can improve rendering speeds at runtime. For example, the hemispherical clamping system can quickly access a precomputed normal sampling database to retrieve hemispherical sampling functions for excluding pixels of the IBL image from sampling on the fly. Additionally, the hemispherical clamping system can more quickly reach convergence based on the improved rendering efficiencies discussed above. That is, the hemispherical clamping system can render a digital image of a virtual environment faster than conventional digital rendering systems because the hemispherical clamping system can sample fewer light paths to reach convergence compared to conventional systems.

The hemispherical clamping system can improve efficiency and speed without sacrificing accuracy or quality in rendering a virtual environment. For example, unlike conventional digital rendering systems, the hemispherical clamping system uses hemispherical sampling functions to clamp the IBL image down to relevant hemispherical regions corresponding to surface points of the virtual object. In this manner, the hemispherical clamping system can focus on accurately capturing the light sources of various brightness or intensity levels that contribute to the direct lighting of certain surface points on the virtual object. Accordingly, in time-sensitive or constrained applications, the hemispherical clamping system can generate more detailed, accurate digital images of the virtual object within the virtual environment compared to conventional digital rendering systems.

As illustrated by the foregoing discussion, the present disclosure utilizes a variety of terms to describe features and benefits of the hemispherical clamping system. Additional detail is now provided regarding the meaning of these terms. For example, as used herein, the term "virtual environment" refers to a digital representation of a three-dimensional space. In particular embodiments, a virtual environment includes a digital representation of a three-dimensional space reflecting a real or fictional object/landscape that a user seeks to render in a digital image. For example, a virtual environment includes a digital landscape depicted in a video game, a digital three-dimensional model of a building under construction, or a digital representation of a virtual or fictional world portrayed in a movie.

Relatedly, the term "virtual object" (or "object") refers to a digital representation of an item, character, person, or thing within a three-dimensional space. In particular embodiments, a virtual object includes a digital representation of a real-world or fictional object that a user seeks to render in a digital image. For example, a virtual object includes a digital avatar or character depicted in a video game. As another example, a virtual object includes a component or portion of a three-dimensional model, such as the glass entrance doors of a building under construction. In yet another example, a virtual object includes digital representations that portray real or fictional objects, such as plants, animals, people, inanimate objects, etc. in a movie.

As also used herein, the terms "image-based light," "image-based lighting image" or "IBL image" refer to a digital image representation of a light source. In particular embodiments, an IBL image represents spherical (or omnidirectional) distant lighting where each pixel of the IBL image comprises an incidental directional radiance (e.g., the incident radiance from a direction with a finite solid angle relative to a surface point of a virtual object). For example, an IBL image can represent highly detailed, realistic lighting of a virtual environment by capturing real-world light information in a raw image using a specialized camera and mapping the raw image onto a dome or sphere, such as a microfacet lobe, a bidirectional scattering distribution function (BSDF) lobe, or an Oren-Nayar lobe.

In addition, as used herein, the term "camera perspective" refers to a point of view in a virtual environment. In particular embodiments, a camera perspective refers to a point of view of a camera represented within a virtual environment from which a digital image will be rendered. For instance, a camera perspective includes a point of view from which a user seeks to render a digital image of the virtual environment. To illustrate, in a first-person video game, a camera perspective includes the point of view from which the virtual environment of the video game is portrayed.

As used herein, the term "hemispherical region" refers to a sub-region or limiting portion of an IBL image. In particular embodiments, a hemispherical region includes a sampling region that approximates a hemisphere for excluding sampling of an IBL image on an opposing side. For example, a hemispherical region may comprise a sampling region of the IBL image that is approximately a hemispherical portion of the IBL image. The hemispherical region need not be an exact hemisphere, but can include less than or more than a hemisphere of the IBL image (e.g., due to approximations and a manner in which the hemispherical clamping system divides the IBL image into blocks).

Further, as used herein, the term "block" refers to a subpart, unit, or portion of a subdivided IBL image. In particular embodiments, each block subdividing an IBL image covers a part of a spherical solid angle. In other words, a block corresponds to a portion of the IBL image that intersects a range of shading normal directions of a virtual object. Accordingly, in some embodiments, a particular block comprises pixels of the IBL image that are located within a range of spherical coordinates (e.g., a range of elevation angles $\theta_1$-$\theta_2$ and a range of azimuth angles $\phi_1$-$\phi_2$), cube map coordinates, angular map coordinates, etc. Moreover, in certain implementations, the hemispherical clamping system can arrange or create blocks of the IBL image into certain configurations, such as rows and columns of blocks. Blocks denotes a particular subpart of an IBL image, but can include a variety of different shapes (not merely rectangles or squares). For example, in some embodiments, blocks can include triangles, hexagons, or other shapes used to subdivide the IBL image.

Relatedly, as used herein, the term "row" refers to an arrangement of items (e.g., pixels or blocks) aligned in a particular direction. It will be appreciated that the hemispherical clamping system can interchange row directions with column directions in its operations. Accordingly, a row includes an arrangement of pixels or blocks in a direction opposite the direction of a column. In particular embodiments, a row includes a plurality of blocks that are perpendicular to a column of blocks. Thus, a row can be a horizontal direction, a vertical direction, or some other direction (e.g., as long as perpendicular to a column). Similarly, a row can include an elevation angle, an azimuth angle, or some other type of spherical coordinate parameter (e.g., as long as opposite to a column).

Additionally, as used herein, the term "column" refers to an arrangement of items (e.g., pixels or blocks) in a direction opposite to a row. In particular embodiments, a column includes a plurality of blocks that are perpendicular to a row of blocks. In addition, a column can be a horizontal direction, a vertical direction, or some other direction (e.g., as long as perpendicular to a row). Similarly, a column can include an elevation angle, an azimuth angle, or some other type of spherical coordinate parameter (e.g., as long as opposite to a row).

As used herein, the term "shading normal direction" refers to a direction normal/perpendicular to a surface point of an object. For example, a shading normal direction can include a vector path that intersects a surface point on a virtual object. In particular embodiments, a shading normal direction for a given surface point includes a vector path that is perpendicular to a surface tangent or tangent plane at the given surface point of the virtual object.

As also used herein, the term "hemispherical sampling function" refers to an importance sampling algorithm that limits sampling of an IBL image (e.g., to a particular hemispherical region). In particular embodiments, a hemispherical sampling function identifies which blocks of a plurality of blocks in an IBL image correspond to a hemispherical region to sample. Additionally, in certain implementations, a hemispherical sampling function includes distribution functions utilized to identify a specific pixel to sample from the blocks corresponding to a given hemispherical region. In certain implementations, a hemispherical sampling function comprises a hemispherical mask, a row-sampling function, and column-sampling function.

As used herein, the term "hemispherical mask" identifies blocks and/or pixels in relation to a particular hemispherical region. In particular embodiments, a hemispherical mask comprises a selection (or inclusion) of a first set of blocks and/or pixels of an IBL image that correspond to a hemispherical region. Additionally or alternatively, a hemispherical mask can identify a second set of blocks of the IBL image to deselect or exclude from the hemispherical region. For example, a hemispherical mask comprises binary values of ones and zeros for the plurality of blocks/pixels of an IBL image based on an indicator function that identifies the pixels and/or blocks that belong to a hemispherical region. In this example, a given hemispherical mask may indicate a first block and/or pixel corresponds to a value of "1" to represent inclusion within a specific hemispherical region. Further, the given hemispherical mask may indicate a second block and/or pixel corresponds to a value of "0" to represent exclusion from the specific hemispherical region.

Further, as used herein, the term "row-sampling function" refers to an algorithm for sampling from among rows of an IBL image. In particular embodiments, the row-sampling function uses an intensity-weighted approach that guides a randomized sampling according to a certain distribution of rows that favors rows with greater light intensities. It can be appreciated that numerous distribution functions may be utilized for this intensity-weighted approach. In one example, a row-sampling function comprises a cumulative distribution function.

Similarly, as used herein, the term "column-sampling function" refers to an algorithm for guiding the sampling from among columns of an IBL image. In particular embodiments, the column-sampling function uses an intensity-weighted approach that guides a randomized sampling according to a certain distribution of columns that favors columns with greater light intensities. As with the row-sampling function, it can be appreciated that numerous distribution functions may be utilized for this intensity-weighted approach for the column-sampling function. In one example, a column-sampling function comprises a cumulative distribution function.

As used herein, the term "normal sampling database" refers to a data structure. In particular embodiments, a normal sampling database comprises one or more digital tables, arrays, or other data structures for indexing entries that include hemispherical sampling functions. For example, a normal sampling database can include a hemispherical mask corresponding to each block of an IBL image. As another example, a normal sampling database can include a unique row-sampling function for each block of an IBL image. In yet another example, a normal sampling database comprises a unique column-sampling function for each row of blocks of an IBL image.

As also used herein, the term "ray direction" refers to an orientation, route, or path between at least two locations or vertices in a virtual environment. In particular, a ray direction includes a vector describing a route of potential light transport within a virtual environment. A ray direction can be represented in a variety of forms. For example, a ray direction can comprise a ray that is cast in a direction from an initial location into a virtual environment. In addition, a ray direction can comprise a vector that defines an altitude and azimuth of one or more path segments making up a light path. Similarly, a ray direction can comprise a vector that defines a starting vertex and an ending vertex between a variety of potential locations, such as between a camera perspective and a surface point on a virtual object, between a first surface point and a second surface point, and between a particular surface point and a pixel of an IBL image. For instance, a ray direction can include a camera ray (e.g., a ray between a camera perspective and a surface point on a virtual object). Additionally or alternatively, a ray direction can include a light ray (e.g., a ray traced from a light source). In addition, a ray direction can include a shadow ray (e.g., a ray traced between a light/light ray and a camera/camera ray).

Relatedly, as used herein, the term "light path" refers to one or more ray directions modeling the transfer of light. In particular embodiments, a light path connects a camera perspective with a light source (e.g., the digital representation of light indicated in the IBL image). For example, a light path is composed of a first ray direction between a camera perspective and a surface point on a virtual object and a second ray direction between the surface point and a pixel of an IBL image.

As used herein, the term "digital image" refers to any digital symbol, graphic, picture, icon, or illustration. For example, a digital image includes digital files with the following file extensions: JPG, TIFF, BMP, PNG, RAW, or PDF. Further, in certain implementations, a digital image can comprise a combination of digital images and/or a series of digital images, such as in a movie file, a GIF file, animation file, etc. A digital image includes a rendering of a virtual environment utilizing a computing device.

Additional detail will now be provided regarding the hemispherical clamping system in relation to illustrative figures portraying example embodiments and implementations of the hemispherical clamping system. For example, FIG. 1 illustrates a computing system environment (or "environment") 100 for implementing a hemispherical clamping system 106 in accordance with one or more embodiments. As shown in FIG. 1, the environment 100 includes server(s) 102, a client device 108, and a network 112. Each of the components of the environment 100 communicate (or are at least configured to communicate) via the network 112, and the network 112 may be any suitable network over which computing devices can communicate. Example networks are discussed in more detail below in relation to FIG. 9.

As further illustrated in FIG. 1, the environment 100 includes the server(s) 102. In some embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement a digital content management system 104 that manages digital files (e.g., virtual environments, IBL images for sampling, and/or digital images for transmission, rendering, or storage). For example, in one or more embodiments, the digital content management system 104 receives, organizes, stores, updates, and/or transmits virtual environments (including IBL images) to process and/or rendered digital images for display. For instance, in certain implementations, the digital content management system 104 comprises a data store of virtual environments to process in relation to certain digital files (e.g., video game files).

The hemispherical clamping system 106 can efficiently render one or more virtual environments. To illustrate, in one or more embodiments, the hemispherical clamping system 106 samples a first ray direction intersecting a surface point of a virtual object. In certain embodiments, the hemispherical clamping system 106 then determines a hemispherical sampling function for limiting sampling of an IBL image to a hemispherical region corresponding to the surface point of the virtual object. In turn, the hemispherical clamping system 106 utilizes the hemispherical sampling function to selectively sample a second ray direction between the surface point of the virtual object and the IBL image. In some embodiments, the hemispherical clamping system 106 generates a digital image of the virtual environment from a camera perspective utilizing the first and second ray direction.

As shown in FIG. 1, the environment 100 includes the client device 108. The client device 108 includes one of a variety of computing devices, including a smartphone, tablet, smart television, desktop computer, laptop computer, virtual reality device, augmented reality device, or other computing device as described in relation to FIG. 9. Although FIG. 1 illustrates a single client device 108, in some embodiments the environment 100 includes multiple client devices 108. In these or other embodiments, the client device 108 further communicates with the server(s) 102 via the network 112. For example, the client device 108 receives user input and provides information pertaining to accessing, viewing, modifying, and/or interacting with a rendered digital image to the server(s) 102.

As shown, the client device 108 includes a hemispherical clamping client system 110. In particular embodiments, the hemispherical clamping client system 110 comprises a web application, a native application installed on the client device 108 (e.g., a mobile application, a desktop application, etc.), or a cloud-based application where part of the functionality is performed by the server(s) 102. In some embodiments, the hemispherical clamping client system 110 presents or displays information to a user associated with the client device 108, including digital images rendered utilizing a hemispherical sampling function.

In additional or alternative embodiments, the hemispherical clamping client system 110 represents and/or provides the same or similar functionality as described herein in connection with the hemispherical clamping system 106. In some implementations, the hemispherical clamping client system 110 supports the hemispherical clamping system 106 on the server(s) 102. Indeed, in one or more embodiments, the client device 108 includes all, or a portion of, the hemispherical clamping system 106.

In some embodiments, though not illustrated in FIG. 1, the environment 100 has a different arrangement of components and/or has a different number or set of components altogether. For example, in certain embodiments, the environment 100 includes a third-party server (e.g., for storing digital images or other data). As another example, the client device 108 communicates directly with the server(s) 102, bypassing the network 112.

Figure 2B:
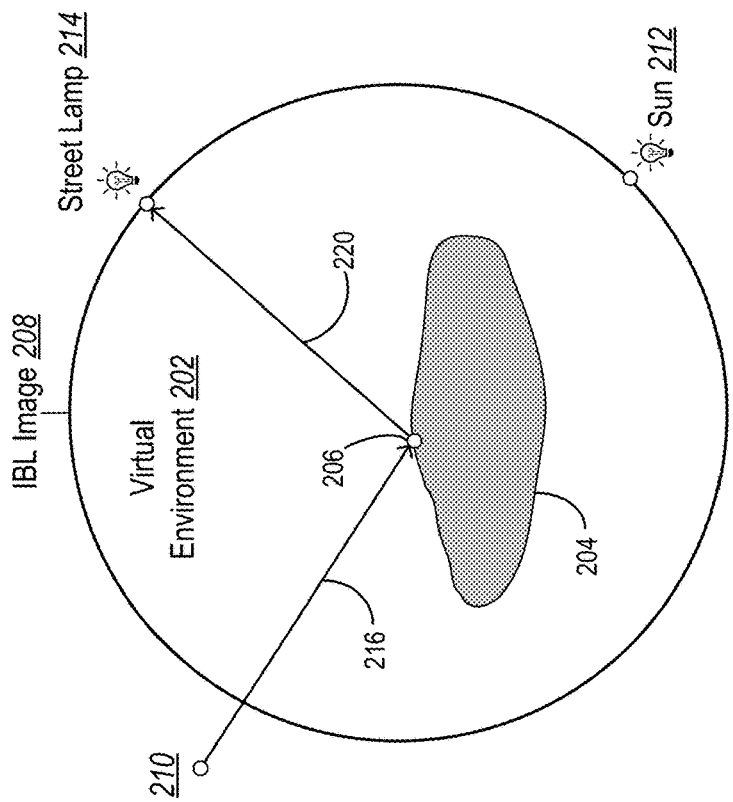
FIG. 2B illustrates a hemispherical clamping system performing improved importance sampling in accordance with one or more embodiments.
Figure 2A:
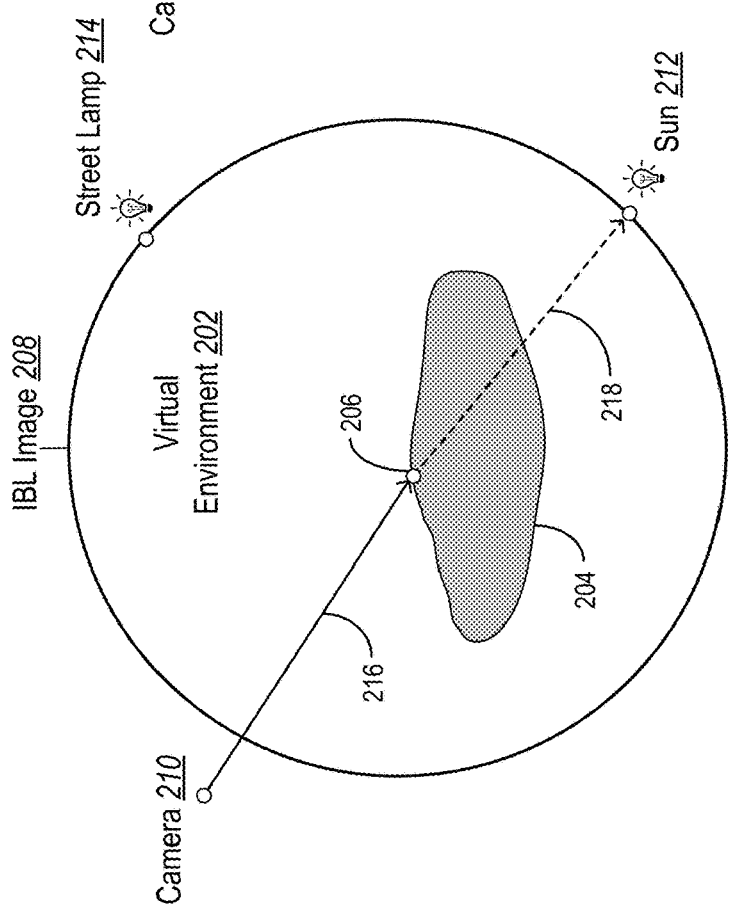
FIG. 2A illustrates prior art methods of conventional digital rendering systems performing typical importance sampling.

As mentioned above, the hemispherical clamping system 106 can provide more efficient and accurate renderings of virtual objects within a virtual environment. As an example, FIG. 2A illustrates prior art methods of conventional digital rendering systems performing importance sampling. In contrast, FIG. 2B illustrates the hemispherical clamping system 106 rendering a virtual environment in accordance with one or more embodiments. In particular, the below description of FIGS. 2A-2B outlines one of many example scenarios in which the hemispherical clamping system 106 can exhibit the computational performance improvements disclosed in this application.

As shown in FIG. 2A, conventional digital rendering systems can perform importance sampling of an IBL image 208 representing the incidental directional radiance within a virtual environment 202 comprising a virtual object 204. To sample the IBL image 208, conventional digital rendering systems aim to sample the brightest or most intense portions of the IBL image 208 regardless of where the brightest or most intense portions of the IBL image 208 are located relative to a surface point 206. Thus, as depicted in FIG. 2A, conventional digital rendering systems sample a light path between a camera 210 and the IBL image 208 along ray directions 216, 218 in order to sample the brightest or most intense portions of the IBL image 208 corresponding to a sun 212.

As discussed previously, this approach of conventional digital rendering systems is computationally inefficient. In FIG. 2A, the sun 212 is positioned on an opposite side from the surface point 206. Therefore, the incidental directional radiance of the IBL image 208 corresponding to the sun 212 does not contribute direct lighting (e.g., light transport without inter-reflections) onto the surface point 206. This erroneous sampling is computationally wasteful and slows rendering runtime.

Exacerbating these technical issues, conventional digital rendering systems repeat attempts at sampling the brightest or most intense portions of the IBL image 208 regardless of location relative to the surface point 206. Accordingly, conventional digital rendering systems fail to adequately sample (or sample at all) portions of the IBL image 208 that correspond to comparatively less intensity, such as a street lamp 214. This is problematic, particularly when the street lamp 214 is on the same side as the surface point 206 and therefore contributes direct lighting onto the surface point 206. Thus, conventional digital rendering systems fail to efficiently and accurately capture certain lighting details and effects within virtual environments.

In contrast, FIG. 2B shows the hemispherical clamping system 106 performing enhanced importance sampling that leverages hemispherical clamping in order to efficiently and accurately sample the portion of the IBL image 208 corresponding to the street lamp 214. For example, the hemispherical clamping system 106 utilizes an improved importance sampling algorithm to identify a relevant portion (e.g., a hemispherical region) of the IBL image 208 that corresponds to a same side of the surface point 206. Within this identified relevant portion of the IBL image 208, incidental directional radiance contributes to direct lighting onto the surface point 206

In turn, one or more embodiments the hemispherical clamping system 106 exclude from sampling those portions of the IBL image 208 that are outside of the identified relevant portion. For instance, the hemispherical clamping system 106 excludes portions of the IBL image 208 that correspond to the sun 212 on the opposite side of the surface point 206. Thus, unlike conventional digital rendering systems, the hemispherical clamping system 106 does not sample the portion of the IBL image 208 corresponding to the sun 212 in rendering the surface point 206.

Instead, one or more embodiments of the hemispherical clamping system 106 sample only within the identified relevant portion of the IBL image 208 (e.g., a specific hemispherical region corresponding to the surface point 206). Indeed, as shown in FIG. 2B, the hemispherical clamping system 106 samples the IBL image 208 by sampling a light path between the camera 210 and the IBL image 208 along ray directions 216, 220. In this manner, the hemispherical clamping system 106 accurately and efficiently captures the lighting effects of the street lamp 214 by sampling the brightest or most intense portions within the identified relevant portion of the IBL image 208 specific to the surface point 206.

Although FIG. 2 illustrates sampling a particular first ray direction and second ray direction in a particular order, as mentioned above, the hemispherical clamping system 106 can implement a variety of different ray-casting and sampling strategies that utilize a variety of different rays and ray casting orders or sequences. For example, the hemispherical clamping system 106 can sample three rays instead of two rays. Accordingly, the "first ray direction" can describe a ray cast between two surface points of one or more objects and the "second ray direction" can include a ray cast between one of the surface points and the IBL-image. Similarly, the hemispherical clamping system 106 can select a ray between the surface point and the IBL-image as an initial ray (and then subsequently sample additional rays toward a camera perspective). Thus, as mentioned above, the hemispherical clamping system 106 can be utilized with a variety of Monte Carlo algorithms for path tracing, bidirectional path tracing, metropolis light transport, etc.

As mentioned above, the hemispherical clamping system 106 can utilize hemispherical clamping to selectively sample an IBL image. FIG. 3 illustrates the hemispherical clamping system 106 utilizing a hemispherical sampling function to generate a digital image in accordance with one or more embodiments. As illustrated, at an act 302, the hemispherical clamping system 106 samples a first ray direction intersecting a surface point on a virtual object. To do so, the hemispherical clamping system 106 utilizes one of many available sampling methods. For example, in some embodiments, the hemispherical clamping system 106 naively and randomly samples the first ray direction such that any visible surface point on the virtual object from the camera perspective can correspond to the first ray direction.

In other embodiments, the hemispherical clamping system 106 randomly samples the first ray direction, but in a manner that uses certain parameters, weights, distribution functions, and/or computer-based models to guide the random sampling of the first ray direction. For example, in certain implementations, the hemispherical clamping system 106 samples the first ray direction by using a Monte Carlo camera importance sampling function as described by Eric Veach in *Robust Monte Carlo Methods For Light Transport Simulation*, a Ph.D. Dissertation (December 1997), archived at graphics.stanford.edu/papers/veach_thesis/thesis-bw.pdf, the contents of which are expressly incorporated herein by reference. Indeed, the hemispherical clamping system 106 may implement a variety of different Monte Carlo algorithms for sampling the first ray direction (e.g., path tracing, bi-directional path tracing, metropolis light transport, etc.).

To illustrate, one or more embodiments of the hemispherical clamping system 106 sample ray directions utilizing one or more of the following functions. For example, in function (1), the hemispherical clamping system 106 represents $I_p$ as the direct lighting rendering result of the pixel p with a window filter $k_p$. In particular, function (1) comprises the integral of direct lighting light paths x whose domain is $\Omega$. One light path sample of x connects a vertex on camera $x_c$, a vertex on geometry surface x, and a vertex on light source $x_l$. The terms W and L represent the corresponding sampling emission importance on the camera and light source respectively. In addition, the terms $f_r$ is the material modeled as a BSDF along the path, and $N(x) \cdot x \to x_l$ represents the dot product between the shading normal at x and the light direction $x \to x_l$. The term V represents a visibility function between two vertices. The visibility function equals one ("1") if visibility is not occluded, and zero ("0") otherwise.

$$I_p = \int_\Omega k_p(x) W(x_c) V(x_c, x) f_r(x_c \to x \to x_l) V(x, x_l) L(x_l) |N(x) \cdot x \to x_l| dx \quad (1)$$

Assuming $\Omega_p$ is the light path domain where $k_p V(x_c, x) V(x, x_l) = 1$, the hemispherical clamping system 106 can represent function (1) in the simplified version shown for function (2).

$$I_p = \int_{\Omega_p} W(x_c) f_r(x_c \to x \to x_l) L(x_l) |N(x) \cdot x \to x_l| dx \quad (2)$$

In addition, $I_p$ can be estimated as $\hat{I}_p$ in function (3) by sampling n light paths $\{x_i\}$ with a probability density function ("pdf") of $\{p(x_i)\}$ according to functions (4) and (5) below. In these functions, $x_i$ is a light path sample of $x_{c,i} \to x_i \to x_{l,i}$. In particular embodiments, the hemispherical clamping system 106 generates a light path $x_i$ in two steps. For example, in one or more embodiments, the hemispherical clamping system 106 samples the camera vertex $x_{c,i}$ and a ray direction $x_{c,i} \to x_i$. Tracing the ray direction, the hemispherical clamping system 106 can then determine a point of intersection with the geometry at a vertex (or surface point) $x_i$. Additionally, in one or more embodiments, the hemispherical clamping system 106 samples a vertex $x_{l,i}$ on the light source (or IBL image) and connects to the vertex $x_i$. As a result, the hemispherical clamping system 106 can likewise represent the pdf p in a decoupled manner with $p_c$ representing the pdf for sampling on the camera and $p_l$ representing the pdf for sampling on the IBL image.

$$\hat{I}_p \approx \frac{1}{n} \sum_i \frac{f(x_i)}{p(x_i)} \quad (3)$$

$$f(x_i) = W(x_c, i) f_r(x_{c,i} \to x_i \to x_{l,i}) |N(x_i) \cdot x_i \to x_{l,i}| \quad (4)$$

$$p(x_i) = p_c(x_{c,i}, x_{c,i} \to x_i) p_l(x_{l,i}) \quad (5)$$

In some embodiments, the hemispherical clamping system 106 utilizes one or more additional functions to estimate an example of ideal importance sampling, where function (4) for $f(x_i)$ is proportional to function (5) for $p(x_i)$. This example of ideal importance sampling involves knowing the target function to be sampled, which is generally not practical or possible in some sampling scenarios. Accordingly, the hemispherical clamping system 106 can approximate the target function as follows according to functions (6) and (7). In particular, function (6) represents that the pdf $p_c$ for sampling on the camera is proportional to the sampling emission importance W on the camera. Similarly, function (7) represents that the pdf $p_l$ for sampling on the IBL image is proportional to the sampling emission importance L on the IBL image.

$$p_c(x_{c,i}, x_{c,i} \to x_i) \propto W(x_{c,i}) \quad (6)$$

$$p_l(x_{l,i}) \propto L(x_{l,i}) \quad (7)$$

As shown in FIG. 3, at an act 304, the hemispherical clamping system 106 determines a hemispherical sampling function that limits sampling of an IBL image. In particular embodiments, the hemispherical clamping system 106 identifies and utilizes a shading normal direction for the surface point corresponding to the first ray direction. For example, the hemispherical clamping system 106 uses the shading normal direction to determine which hemispherical sampling function applies to the surface point (e.g., as described more below in relation to FIG. 5A). To briefly illustrate, in certain implementations, the hemispherical clamping system 106 identifies where the shading normal direction intersects the IBL image (e.g., at which block of the IBL image). From the intersection, one or more embodiments of the hemispherical clamping system 106 access a precomputed normal sampling database to identify a corresponding hemispherical sampling function that indicates a hemispherical region (denoted in dashed lines) specific to the surface point.

As illustrated in FIG. 3, at an act 306, the hemispherical clamping system 106 samples a second ray direction within the hemispherical region. In particular embodiments, the hemispherical clamping system 106 samples the second ray direction utilizing the hemispherical sampling function. In some embodiments, the hemispherical sampling function is a single probability distribution (e.g., a block-specific distribution function) that corresponds to the hemispherical region. The hemispherical clamping system 106 applies the probability distribution to sample a particular pixel.

In one or more embodiments, the hemispherical clamping system 106 uses a hemispherical sampling function that includes two or more individual probability distributions. For example, in some embodiments the hemispherical sampling function includes a row-sampling function and a column-sampling function to selectively sample the second ray direction between the surface point and a particular pixel of the IBL image. These and other aspects of sampling the second ray direction are described more below in relation to FIGS. 5A-5B.

In general though, certain implementations of the hemispherical clamping system 106 sample a particular pixel according to one or more of the following example functions. For example, in some embodiments, the hemispherical clamping system 106 utilizes one of many possible parameterizations to sample the second ray direction between the surface point and a particular pixel of the IBL image. The distant environmental lighting of the IBL image comes from an entire sphere of directions with a solid angle of $4\pi$. Accordingly, certain embodiments of the hemispherical clamping system 106 implement parameterizations to pinpoint a pixel positioned at certain pixel coordinates. These pixel coordinates can correspond to cube maps, light probes (angular maps), or latitude-longitude maps. In these or other embodiments, this description references latitude-longitude parameterizations v and u to respectively represent pixel rows and pixel columns of the IBL image. Both v and u are normalized to [0, 1] and can relate to spherical directions (e.g., elevation $\theta$ and azimuth $\phi$) according to functions (8) and (9) below.

$$\theta(v) = (1-v)\pi \quad (8)$$

$$\phi(u) = 2(1-u)\pi \quad (9)$$

Additionally, one or more embodiments of the hemispherical clamping system 106 sample the second ray direction based on functions (10), (11), and/or (12). For example, given an IBL image E with a resolution w×h, a sampling vertex on $x_{I,i}$ of the IBL image is equivalent to a coordinate $\{u_i, v_i\}$ having a solid angle represented by function (10). In addition, the emission at the sampling vertex $x_{I,i}$ is the color of the image scaled with the solid angle according to function (11). Thus, to importance sample the IBL image, the hemispherical clamping system 106 can reformulate $\{u_i, v_i\}$ according to function (11) such that w and h are constant (and therefore ignored), as shown in function (12).

$$A(w, h, v) = \frac{2\pi^2}{wh}\sin(\theta) \quad (10)$$

$$L(x_{I,i}) = E(u_i, v_i)A(w, h, v_i) \quad (11)$$

$$p_I(u_i, v_i) \propto E(u_i, v_i)\sin(v_i) \quad (12)$$

In particular embodiments, the hemispherical clamping system 106 uses a function (13) as a basis to exclude sampling of the IBL image at locations $x_{I,i}$ (e.g., where on opposite sides of a surface point $x_i$). Function (13) also indicates that the sampling probability density function for a pixel at a set of pixel coordinates $u_i, v_i$ of a block is dependent on the shading normal direction for the surface point $x_i$.

Aspects of block-specific functions for pixel sampling are described more below in relation to FIG. 3. In general though, function (13) is composed of two factors. Indeed, function (13) includes a first factor comprising the sampling probability density function of a block according to function (20) described below. Further, function (13) includes a second factor comprising the sampling probability density function for a pixel at pixel coordinates $u_1, v_i$ within a sampled block according to function (15), also described below.

$$\tilde{p}_I(u_i, v_i | x_i) \propto \max(\text{sgn}(N(x_i) \cdot x_i \to x_{I,i}), 0)E(u_i, v_i)\sin(v_i) \quad (13)$$

In function (13), the term $\tilde{p}_I(u_i, v_i | x_i)$ represents the probability density function for sampling a specific pixel at a set of pixel coordinates $u_1, v_i$ given a surface point $x_i$ sampled on a virtual object. In addition, the term $\max(\text{sgn}(N(x_i) \cdot x_i \to x_{I,i}), 0)$ represents the maximum function returning the greater of zero or the sign function of the dot product of a shading normal direction $N(x_i)$ and a ray direction $x_i \to x_{I,i}$ between the surface point and IBL image. Further, the term $E(u_i, v_i)\sin(v_i)$ in function (13) represents the emission of a pixel at pixel coordinates $u_i, v_i$ of the IBL image being multiplied by the sine of the pixel coordinate $v_i$. The operator "$\propto$" means "is proportional to."

As illustrated in FIG. 3, at an act 308, the hemispherical clamping system 106 generates a digital image of the virtual environment utilizing the first ray direction and the second ray direction. In particular embodiments, the hemispherical clamping system 106 renders a ray following a light path between the camera perspective and the IBL image along the first ray direction, the surface point, and the second ray direction. In certain implementations, the hemispherical clamping system 106 renders the ray utilizing a central processing unit Monte Carlo renderer. Additionally, in specific embodiments, the hemispherical clamping system 106 renders the ray utilizing certain rendering functions or models, such as the rendering equation described in James T. Kajiya, *The Rendering Equation*, In ACM SIGGRAPH Computer Graphics (August 1986), archived at doi.org/10.1145/15886.15902, the contents of which are expressly incorporated herein by reference.

Moreover, the hemispherical clamping system can perform the act 308 by rendering many light paths. For example, in one or more embodiments, the hemispherical clamping system 106 iteratively performs the acts 302-306 such that the hemispherical clamping system 106 samples a plurality of ray-direction combinations that correspond to a plurality of different surface points on the virtual object. To illustrate, at the act 302, the hemispherical clamping system 106 samples a third ray direction intersecting an additional (e.g., different) surface point of the virtual object. Then, at the act 304, one or more embodiments of the hemispherical clamping system 106 utilize an additional shading normal direction of the additional surface point to determine an additional hemispherical sampling function. This additional hemispherical sampling function can limit sampling of the IBL image to an additional hemispherical region that corresponds to the additional surface point of the virtual object.

Further, in some embodiments, the act 306 comprises sampling a fourth ray direction between the additional surface point of the virtual object and the IBL image. For example, the hemispherical clamping system 106 uses the additional hemispherical sampling function to sample the fourth ray direction by sampling a specific pixel of the IBL image within the additional hemispherical region. At the act 308, one or more embodiments of the hemispherical clamping system 106 subsequently generate the digital image of the virtual environment by additionally utilizing the third ray direction and the fourth ray direction. For instance, the hemispherical clamping system 106 renders an additional ray following an additional light path between the camera perspective and the IBL image along the third ray direction, the additional surface point and the fourth ray direction.

Figure 4:
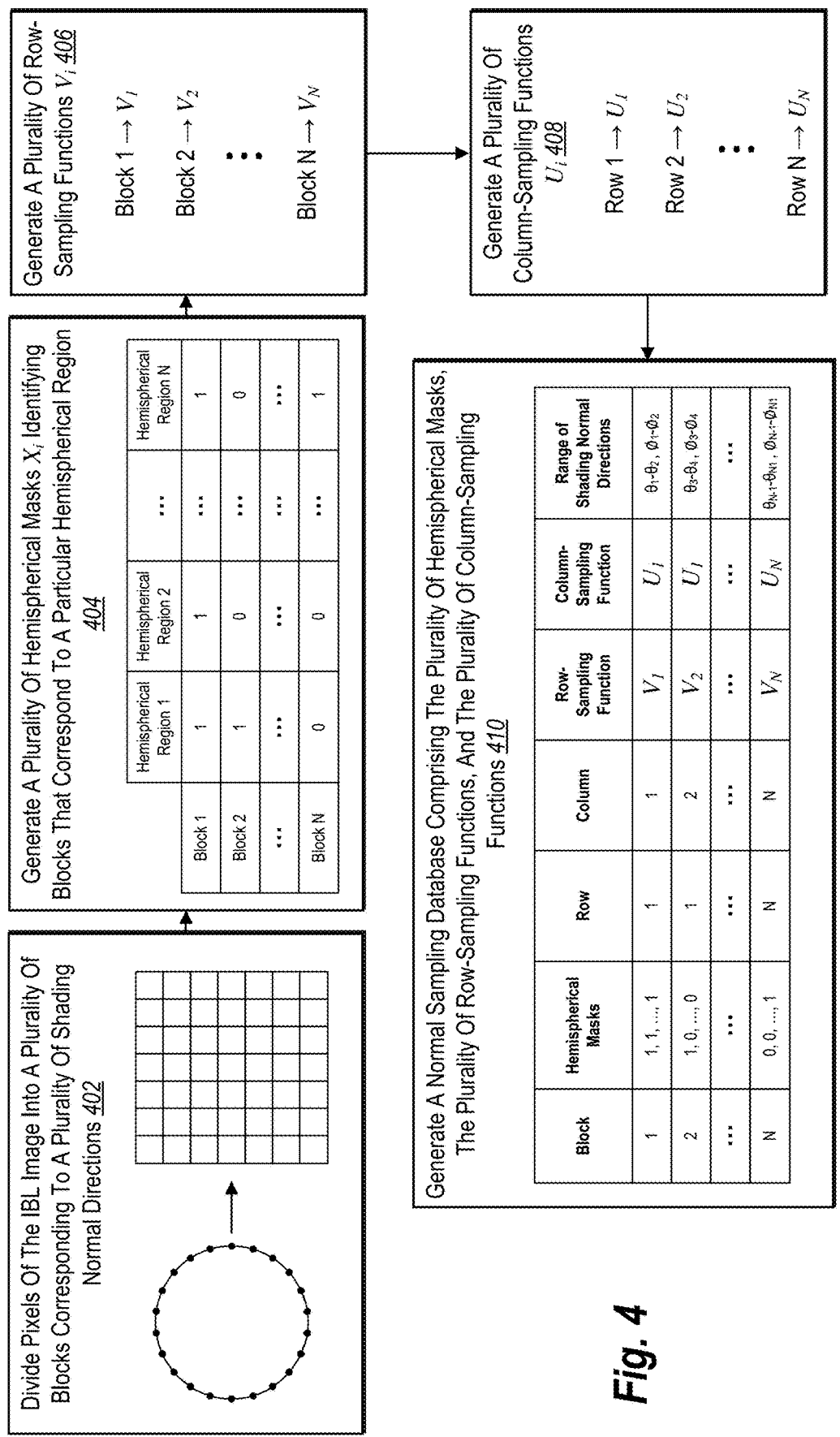
FIG. 4 illustrates a hemispherical clamping system generating a normal sampling database.

As mentioned above, the hemispherical clamping system 106 can quickly access a precomputed normal sampling database to retrieve hemispherical sampling functions for excluding, on the fly, pixels of the IBL image from being sampled. To provide this improved efficiency during rendering runtime, in one or more embodiments, the hemispherical clamping system 106 precomputes the normal sampling database prior to runtime. For example, FIG. 4 illustrates the hemispherical clamping system 106 generating a normal sampling database in accordance with one or more embodiments. In particular, FIG. 4 illustrates the hemispherical clamping system 106 generating the normal sampling database by generating various hemispherical sampling functions, including hemispherical masks, row-sampling functions, and column-sampling functions.

As illustrated in FIG. 4, at an act 402, the hemispherical clamping system 106 divides pixels of the IBL image into a plurality of blocks corresponding to a plurality of shading normal directions. In one or more embodiments, the hemispherical clamping system 106 uses one of myriad suitable approaches for dividing pixels of the IBL images into the plurality of blocks. For example, in certain implementations, the hemispherical clamping system 106 evenly sub-divides an IBL image into rows and columns of blocks. In these or other embodiments, the plurality of blocks for the IBL image comprise the block dimensions of $R_{column} \times S_{row}$, where $R_{column}$ represents the number of columns of blocks and $S_{row}$ represents a number of rows of blocks, such as 16×8 blocks.

In these or other embodiments, the hemispherical clamping system 106 evenly divides the pixels into blocks such that a predetermined range of shading normal directions fall within each block. For example, the hemispherical clamping system 106 divides the pixels such that each block corresponds to a unique range of shading normal directions, but a same range value (e.g., a range value comprising +/−11.25 degrees elevation and +/−22.5 degrees azimuth).

Alternatively, in some embodiments, the hemispherical clamping system 106 unevenly sub-divides the IBL images into the plurality of blocks. For example, in one or more embodiments, the hemispherical clamping system 106 divides pixels of the IBL image based on pixel emission levels. To illustrate, the hemispherical clamping system 106 groups or clusters pixels according to one or more emission distribution functions. In at least this example, the hemispherical clamping system 106 generates blocks of the IBL image that are not necessarily limited to blocks of a same size or of a same shape. Indeed, in one or more embodiments, the hemispherical clamping system 106 divides the pixels of the IBL image such that a variety of different shapes and/or sizes of blocks sub-divide the IBL image.

In at least some embodiments, the hemispherical clamping system 106 divides the pixels of the IBL images into blocks based on a computational efficiency. For example, a higher block resolution with smaller block sizes allows the hemispherical clamping system 106 to more closely approximate a hemisphere. This closer hemispherical approximation allows the hemispherical clamping system 106 to exclude more pixels from being sampled in the IBL image. However, the higher block resolution introduces increased storage costs. In contrast, a lower block resolution with bigger block sizes lends to a looser approximation of a hemisphere but decreased storage costs and faster runtime speeds. Accordingly, one or more embodiments of the hemispherical clamping system 106 divide the pixels of the IBL image according to a predetermined block resolution R×S (e.g., 64×32, 16×8, etc.) that balances the foregoing interests.

At an act 404, the hemispherical clamping system 106 generates a plurality of hemispherical masks identifying blocks that correspond to a particular hemispherical region. There are a number of methods to generate the hemispherical masks. For example, in some embodiments, the hemispherical clamping system 106 identifies, for each given block, a unique hemispherical region comprising the neighboring blocks within a range of spherical directions (e.g., +/− about 95 degrees elevation, +/− about 95 degrees azimuth).

As another example, the hemispherical clamping system 106 uses one or more algorithm-based approaches. For example, in some embodiments, the hemispherical clamping system 106 utilizes one or more of the following functions to generate the plurality of hemispherical sampling functions. According to function (14), one or more embodiments of the hemispherical clamping system 106 determine the total light emission for the IBL image $E_B(r,s)$ within each block $B(r,s)$.

$$E_B(r, s) = \frac{2\pi^2}{wh} \sum_{\{u_i,v_i\}\in B(r,s)} E(u_i, v_i)\sin(v_i) \quad (14)$$

In function (14), the parameters w,h represent dimensional components of the IBL image resolution w×h. In addition, the term $E(u_i,v_i)$ represents the emission of a pixel at pixel coordinates $u_i,v_i$ of the IBL image mapped to a spherical direction with a finite solid angle according to corresponding elevation and azimuth functions (8) and (9) above. Further, the term $\sin(v_i)$ represents a sine function for the pixel coordinate $v_i$.

Based on the foregoing functions, one or more embodiments of the hemispherical clamping system 106 define a hemispherical region $H(x_i)$ for a sampled vertex or surface point $x_i$ according to function (16):

$$H(x_i)=\{B(r,s)|\chi(B(r,s),B(r_{x_i},s_{x_i}))\} \quad (16)$$

In function (16), the x represents an indicator function with inputs $B(r,s)$ for each block of the IBL image and $B(r_{x_i}, s_{x_i})$ for a specific block corresponding to a shading normal direction of the sampled surface point $x_i$. That is, according to the indicator function x in function (16), the hemispherical clamping system 106 compares the range of shading normal directions of each block in the IBL image relative to the shading normal direction for the surface point $x_i$ intersecting the specific block $B(r_{x_i},s_{x_i})$. In so doing, the hemispherical clamping system 106 generally defines each hemispherical region as comprising a unique set of the blocks in the IBL image (e.g., about half of the blocks).

To illustrate, the hemispherical clamping system 106 returns a value of "1" if the hemispherical clamping system 106 determines that the shading normal direction is in a same hemisphere as at least one shading normal direction corresponding to a queried block. This value of "1" indicates that the hemispherical mask for the specific block $B(r_{x_i},s_{x_i})$ includes or selects the queried block as being part of a hemispherical region.

In contrast, the hemispherical clamping system 106 returns a value of "0" if the hemispherical clamping system 106 determines that the shading normal direction is not in a same hemisphere as at least one shading normal direction corresponding to the queried block. In particular, the value of "0" indicates that the hemispherical mask for the specific block $B(r_{x_i},s_{x_i})$ excludes or deselects the queried block from being part of the hemispherical region.

In one or more embodiments, the hemispherical clamping system 106 repeats the foregoing approach to generate a hemispherical mask for each block of the IBL image. Indeed, as shown for illustration at the act 404, the hemispherical clamping system 106 generates the plurality of hemispherical masks that individually indicate how respective blocks of the IBL image correspond to hemispherical regions. For example, a first hemispherical mask corresponding to a given block indicates that a "Hemispherical Region 1" comprises "Block 1" and "Block 2," but not "Block N." As another example, a second hemispherical mask corresponding to another given block indicates a "Hemispherical Region 2" comprises "Block 1," but not "Block 2" or "Block N." Similarly, a third hemispherical mask corresponding to yet another given block indicates a "Hemispherical Region N" comprises "Block 1" and "Block N," but not "Block 2."

Additionally shown in FIG. 4, at an act 406, the hemispherical clamping system 106 generates a plurality of row-sampling functions. In particular embodiments, the hemispherical clamping system 106 generates the plurality of row-sampling functions by generating an emission-intensity-weighted function that guides a randomized sampling according to a certain distribution of pixel rows in the blocks. Under this approach, the hemispherical clamping system 106 can favor sampling from pixel rows within blocks having greater light emission. Moreover, it can be appreciated that numerous distribution functions may be utilized for this emission-intensity-weighted function.

To illustrate one example, one or more embodiments of the hemispherical clamping system 106 utilize function (17) to sample from a row of pixels within the IBL image.

$$\tilde{p}_i(u_i,v_i|x_i)=p_B(r,s|x_i)p_{l,\{r,s\}}(u_i,v_i) \quad (17)$$

According to function (17), one or more embodiments of the hemispherical clamping system 106 take two acts to sample a specific pixel at a set of pixel coordinates $u_i, v_i$ given a surface point $x_i$. In particular, the hemispherical clamping system 106 determines $p_B(r,s|x_i)$ according to function (20) described below that represents the probability of sampling from a block of the IBL image given the surface point $x_i$ on the virtual object. Moreover, the hemispherical clamping system 106 determines $p_{l,\{r,s\}}$ according to function (15) representing the sampling probability density function for a pixel at pixel coordinates $u_i, v_i$ within a sampled block.

In certain embodiments, however, the hemispherical clamping system 106 does not implement the separate sampling steps according to function (17). Rather, the hemispherical clamping system 106 implements row and column sampling functions to more efficiently identify a particular pixel. For example, the hemispherical clamping system 106 modifies function (17) to generate a row-sampling function according to function (18).

$$\tilde{p}_{l,v}(v_i | x_i) = \int_0^1 \tilde{p}_l(u_i, v_i | x_i) du_i \qquad (18)$$

Based on function (18), the hemispherical clamping system 106 determines the probability distribution function for sampling rows of pixels given a unique block corresponding to the shading normal direction of a surface point.

Thus, at the act 406, one or more embodiments of the hemispherical clamping system 106 use function (18) to generate a row-sampling function for each block of the IBL image (e.g., as shown in FIG. 4). For example, the hemispherical clamping system 106 generates a first row-sampling function "$V_1$" for "Block 1," a second row-sampling function "$V_2$" for "Block 2," and so forth to the n-th row-sampling function "$V_N$" for "Block N."

Further shown in FIG. 4, at an act 408, the hemispherical clamping system 106 generates a plurality of column-sampling functions. Similar to row-sampling functions, the hemispherical clamping system 106 generates the plurality of column-sampling functions by generating an emission-intensity-weighted function that guides a randomized sampling according to a certain distribution of pixel columns within blocks. Under this approach, the hemispherical clamping system 106 can favor sampling from pixel columns within blocks having greater light emission. Moreover, the hemispherical clamping system 106 can utilize numerous distribution functions for this emission-intensity-weighted function.

As a particular example, the hemispherical clamping system 106 generates a column-sampling function according to function (19).

$$\tilde{p}_{l,u}(u_i | x_i, v_i) = \frac{\tilde{p}_l(u_i, v_i | x_i)}{\tilde{p}_{l,v}(v_i | x_i)} \qquad (19)$$

In function (19), the numerator represents the conditional distribution function in function (17), given the sampled surface point $x_i$ (and/or corresponding block). In addition, the denominator represents the row-sampling function according to function (18). In other words, $\tilde{p}_{l,u}(u_i|x_i,v_i)$ in function (19) represents the pdf for sampling a pixel within a particular pixel column given a sampled row of pixels.

Accordingly, one or more embodiments of the act 408 comprise the hemispherical clamping system 106 using function (19) to generate a column-sampling function for each row of the IBL image (e.g., as shown in FIG. 4). For example, the hemispherical clamping system 106 generates a first column-sampling function "$U_1$" for "Row 1," a second column-sampling function "$U_2$" for "Row 2," and so forth to the n-th column-sampling function "$U_N$" for "Row N."

In one or more embodiments, the hemispherical clamping system 106 can utilize additional or alternative algorithms to perform the acts 406-408. For example, in certain implementations, the hemispherical clamping system 106 determines a probability density function for sampling blocks of the IBL image such that the probability of sampling a given block is proportional to the emission of the block. Function (20) provided below represents this relationship:

$$p_B(r, s | x_i) = \frac{E_B(r, s)}{\sum_{B(r', s') \in H(x_i)} E_B(r', s')} \qquad (20)$$

In function (20), the term $p_B(r,s|x_i)$ represents the probability of sampling from a block of the IBL image given a sampled vertex or surface point $x_i$ on a virtual object. The numerator in function (20) comprises the term $E_B(r,s)$, which is defined according to function (14) above. In addition, the denominator in function (20) represents the light emission from all of the blocks within the hemispherical region.

At an act 410, the hemispherical clamping system 106 generates a normal sampling database comprising the plurality of hemispherical masks from the act 404, the plurality of row-sampling functions from the act 406, and the plurality of column-sampling functions from the act 408. In particular embodiments, the hemispherical clamping system 106 combines each of the components of the normal sampling database into a single data structure (e.g., as shown in FIG. 4). In other embodiments, the hemispherical clamping system 106 generates the normal sampling database as comprising separate data structures (e.g., for storage in different memory devices or memory partitions of a memory device).

In some embodiments, the act 410 comprises the hemispherical clamping system 106 implementing a variety of storage techniques for the normal sampling database. In certain implementations, these storage techniques can reduce storage consumption from storing one or more of the plurality of the hemispherical masks, the plurality of row-sampling functions, and the plurality of column-sampling functions. Additionally or alternatively, these storage techniques can increase rendering speeds at runtime (e.g., by being able to search for and/or retrieve digital entries from the normal sampling database faster).

To illustrate, in one or more embodiments, the hemispherical clamping system 106 excludes certain hemispherical masks from storing within the normal sampling database. For example, the term $\chi$ in function (16) takes up a volume of $(R \times S)^2$ because the hemispherical mask for each block indicates whether each of the other blocks in the IBL image are included within a hemispherical region. However, one or more embodiments of the hemispherical clamping system 106 store much less than $(R \times S)^2$ hemispherical mask entries.

Specifically, in certain implementations, the hemispherical clamping system 106 stores R×S×S×2 hemispherical masks based on a two-dimensional block range (e.g., between a start block and a stop block) that identifies the blocks that correspond to a hemispherical region. Accordingly, one or more embodiments of the hemispherical clamping system 106 can greatly reduce the amount of stored information to that which corresponds to the two-dimensional block range.

In this example, the hemispherical clamping system 106 determines that blocks within a row are adjacent to each other and that a left-most block in a row is adjacent to the right-most block in the row. Accordingly, the hemispherical clamping system 106 can store a starting block and an ending block in each row that belongs to a hemispherical region (rather than identifying each block individually).

The hemispherical clamping system 106 can also reduce storage and processing requirements by utilizing the row-sampling and column-sampling approach discussed above. Indeed, the hemispherical clamping system 106 can avoid the computational requirements of determining function (17) above. Rather, the hemispherical clamping system 106 stores entries corresponding to the plurality of row-sampling functions. For example, the hemispherical clamping system 106 stores R×S×h row-sampling functions of $\tilde{p}_{l,v}(v_i|x_i)$ for all blocks, where h is a length of array generated according to according to function (18). Then, the hemispherical clamping system 106 stores only w×h column-sampling functions generated according to function (19), which corresponds to one column-sampling function for each row.

Still further, another example storage technique comprises storing a range of shading normal directions for each block in the IBL image. In particular embodiments, the range of the shading normal directions for a given block depends on the block resolution R×S. For example, the hemispherical clamping system 106 stores larger and fewer range values of shading normal directions for a lower block resolution or bigger block sizes. In contrast, the hemispherical clamping system 106 stores smaller and more range values of shading normal directions for a higher block resolution (or smaller block sizes).

Alternatively to the foregoing embodiments, in some instances, the hemispherical clamping system 106 foregoes generating and storing certain components of the normal sampling database until runtime. Accordingly, in one or more embodiments, the hemispherical clamping system 106 generates and/or stores one or more of the hemispherical masks, row-sampling functions, and/or column-sampling functions during rendering.

Although FIG. 4 illustrates an embodiment that uses hemispherical masks, row-sampling functions, and column-sampling functions, the hemispherical clamping system 106 can utilize different functions and data structures. For example, in some embodiments, the hemispherical clamping system 106 utilizes a single probability distribution to sample a pixel from a particular hemisphere corresponding to a block of the IBL image. To illustrate, in certain implementations, the hemispherical clamping system 106 does not generate, store, and/or utilize row-sampling functions and/or column-sampling functions. Instead, one or more embodiments of the hemispherical clamping system 106 use a block-specific distribution function to sample a particular pixel from a specific hemispherical region.

Figure 5A:
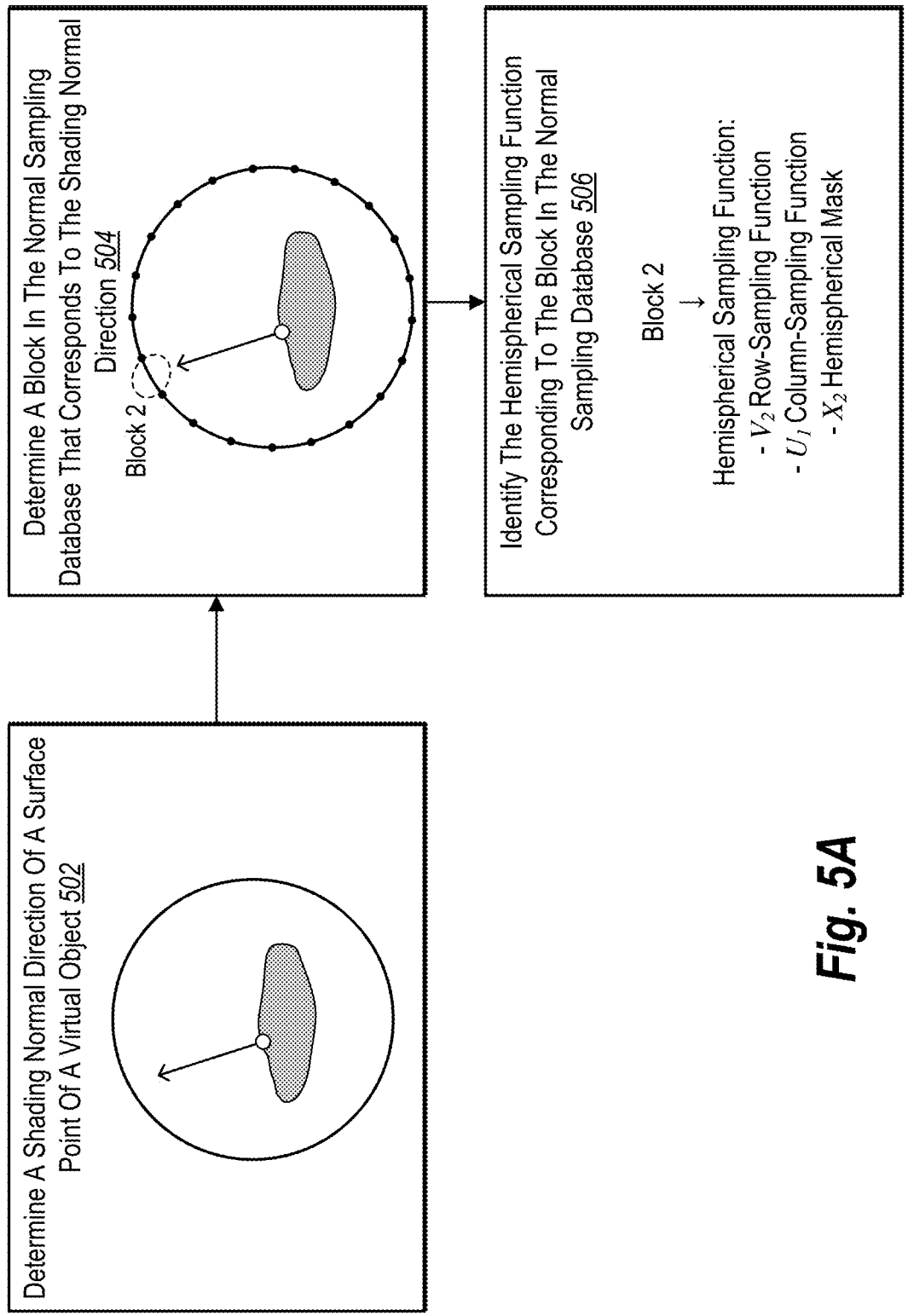

As mentioned above, the hemispherical clamping system 106 can rapidly retrieve data entries from a normal sampling database to provide faster, more efficient rendering runtimes compared to conventional digital rendering systems. FIGS. 5A-5B illustrate the hemispherical clamping system 106 accessing a normal sampling database to sample a pixel of an IBL image in accordance with one or more embodiments.

At an act 502, the hemispherical clamping system 106 determines a shading normal direction of a surface point of a virtual object (e.g., based on a first sampled ray direction indicating the surface point). There are a variety of ways to determine shading normal directions. As one example, the hemispherical clamping system 106 determines the shading normal direction by generating a surface or plane tangent to the surface point. In turn, the hemispherical clamping system 106 determines the vector path that is perpendicular to the surface tangent or tangent plane at the surface point of the virtual object.

At an act 504, the hemispherical clamping system 106 determines a block in the normal sampling database that corresponds to the shading normal direction. To do so, one or more embodiments of the hemispherical clamping system 106 apply one of many possible data retrieval methods. As one example, the hemispherical clamping system 106 queries the shading normal direction against the ranges of the shading normal directions in the normal sampling database. In turn, the hemispherical clamping system 106 identifies a particular block (e.g., "Block 2") corresponding to the shading normal direction based on the shading normal direction falling within a particular range of shading normal directions for the particular block.

Additionally or alternatively, in certain implementations, the hemispherical clamping system 106 determines a block in the normal sampling database by determining where on the IBL image that the shading normal direction intersects. Using this point of intersection, one or more embodiments of the hemispherical clamping system 106 identify a corresponding block. For example, the hemispherical clamping system 106 queries the point of intersection for the shading normal direction against pixel coordinates for pixels corresponding to predetermined blocks in the normal sampling database.

At an act 506, the hemispherical clamping system 106 identifies a hemispherical sampling function corresponding to the block in the normal sampling database. Again, a number of different data retrieval methods may apply to the act 506. In a particular example, the hemispherical clamping system 106 hemispherical clamping system 106 extracts one or more of the digital entries corresponding to the identified block. For example, for "Block 2," the hemispherical clamping system 106 accesses the normal sampling database to identify that the hemispherical sampling function for "Block 2" comprises a "$V_2$" row-sampling function, a "$U_1$" column-sampling function, and an "$X_2$" hemispherical mask.

At an act 508 in FIG. 5B, the hemispherical clamping system 106 samples a row of the IBL image utilizing the hemispherical mask and row-sampling function corresponding to the identified hemispherical sampling function. To do so, one or more embodiments of the hemispherical clamping system 106 identify which blocks correspond (and do not correspond) to a hemispherical region according to the hemispherical mask. Based on the identified blocks, the hemispherical clamping system 106 excludes blocks of the IBL image so as to row sample from pixel rows in blocks corresponding to the hemispherical region.

For example, the hemispherical clamping system 106 identifies blocks within the "$X_2$" hemispherical mask associated with a binary value of "1" as corresponding to particular hemispherical region for "Block 2." In addition, the hemispherical clamping system 106 identifies blocks within the "$X_2$" hemispherical mask corresponding to a binary value of "0" for the particular hemispherical region for "Block 2." In turn, the hemispherical clamping system 106 excludes the identified blocks within the "$X_2$" hemispherical mask corresponding to a binary value of "0" (e.g., by removing the identified blocks from one or more distribution functions).

In these or other embodiments, the hemispherical clamping system 106 normalizes distribution functions after excluding certain blocks from being sampled. For example, the hemispherical clamping system 106 normalizes the "$V_2$" row-sampling function for "Block 2" such that the probabilities of sampling a given row sum to one after excluding certain blocks according to the "$X_2$" hemispherical mask.

As mentioned above, one or more embodiments of the hemispherical clamping system 106 then utilize the row-sampling function (e.g., the normalized row-sampling function) to sample a row of pixels corresponding to a hemispherical region. For example, in one or more embodiments, the hemispherical clamping system 106 determines a distribution according to the "$V_2$" row-sampling function. In turn, one or more embodiments of the hemispherical clamping system 106 use that distribution to sample a particular row (e.g., by randomly sampling a row according to the set distribution). Indeed, as also indicated above, the hemispherical clamping system 106 can utilize a variety of different types of distributions to sample a particular row.

One example type of distribution is a cumulative distribution function (e.g., based on emission intensities of rows). For example, in certain implementations, the hemispherical clamping system 106 identifies the distribution according to the "$V_2$" row-sampling function as a distribution function per function (18) described above. To illustrate, the hemispherical clamping system 106 converts a probability distribution function to a cumulative distribution function and then utilizes a uniformly distributed random number to select a row. For instance, as shown in FIG. 5B, the cumulative distribution function reflects probability values for emission intensities "I" in a cumulative fashion (e.g., from left-to-right) across horizontal regions of the hemispherical region corresponding to "Block 2." Specifically, FIG. 5B shows the probability values for emission intensities beginning with $I_0$ on the left-hand side and ending on the right-hand side with $I_0+ \ldots +I_{n-3}+I_{n-2}+I_{n-1}+I_n$. Accordingly, one or more embodiments of the hemispherical clamping system 106 are more likely to sample from the brighter, more intense rows.

At an act 510, the hemispherical clamping system 106 samples a pixel from the row of the IBL image utilizing the hemispherical mask and a column-sampling function. As discussed above, the hemispherical clamping system 106 uses the hemispherical mask (e.g., the "$X_2$" hemispherical mask for "Block 2") to exclude certain blocks of the IBL image outside of the hemispherical region. Moreover, after the act 508, one or more embodiments of the hemispherical clamping system 106 utilize the column-sampling function to selectively sample a pixel at a particular column within the sampled row of the hemispherical region.

In certain embodiments, the hemispherical clamping system 106 likewise normalizes the column-sampling functions (e.g., to account for excluded columns of blocks). For example, the hemispherical clamping system 106 modifies the column-sampling functions such that the sampling probabilities for sampling columns (given a row) sums to one.

As mentioned previously, one or more embodiments of the hemispherical clamping system 106 sample a pixel from within a sampled row using a variety of different distribution functions comprising the column-sampling function. For instance, similar to the row-sampling function, the hemispherical clamping system 106 determines a distribution according to the "$U_1$" column-sampling function. In turn, one or more embodiments of the hemispherical clamping system 106 use that distribution to sample a particular column (e.g., by randomly sampling a column according to the set distribution).

One example type of distribution for column-sampling functions is a cumulative distribution function (e.g., based on emission intensities of columns). To illustrate, in certain implementations, the hemispherical clamping system 106 identifies the distribution for the "$U_1$" column-sampling function as a cumulative distribution function by converting the pdf provided in function (19) described above. Specifically, the hemispherical clamping system 106 can determine a cumulative distribution function from the probability distribution function and then utilize a uniformly distributed random number to select a particular column/pixel. For instance, although not shown in FIG. 5B, the cumulative distribution function for column-sampling would appear similar to what is shown with respect to the act 508 for row-sampling. Indeed, the cumulative distribution function can identify probability values for emission intensities "I" in a cumulative fashion (e.g., from top-to-bottom), but specifically across vertical regions of the hemispherical region for "Block 2" corresponding to the sampled pixel row. Accordingly, one or more embodiments of the hemispherical clamping system 106 are more likely to sample a pixel within the prior-sampled row at brighter, more intense pixel columns.

It can be appreciated that the foregoing description with respect to the acts 508-510 for arranging probability values across regions of the hemispherical region can have a number of different applications. For example, in some embodiments, the regions used to divide the probability values based on emission intensities for selecting a pixel correspond to the same rows and columns of blocks used to divide the IBL image. However, the present application is not so limited. For example, in certain implementations, the ranges or regions used to divide the probability values for selecting a pixel are independent of the blocks sub-dividing the IBL image. Still further, in alternative embodiments, the hemispherical clamping system 106 performs one or more of the foregoing acts and algorithms on an individual pixel basis (e.g., independent of blocks of the IBL image and/or probability-value regions).

Additionally or alternatively, one or more embodiments of the hemispherical clamping system 106 include row-sampling functions and/or column-sampling functions that correspond to sampling a block instead of a pixel as described above. Indeed, row-sampling functions and/or column-sampling functions are not limited to distribution functions for sampling pixels. For example, in certain implementations, the hemispherical clamping system 106 uses a row-sampling function to sample a row of blocks (instead of a row of pixels) and then the column-sampling function to sample a column of blocks within the given row of blocks (instead of a pixel column). In this example, the hemispherical clamping system 106 can then use one or more distribution functions (e.g., as disclosed in this application) to identify a particular pixel to sample within a specific block.

Further, and as indicated above, one or more embodiments of the hemispherical clamping system 106 do not utilize multiple probability distributions. For example, in certain implementations, the hemispherical clamping system 106 utilizes only a single probability distribution to sample a pixel within a particular hemisphere. To illustrate, the single probability distribution may include a block-specific probability distribution that corresponds to the block intersecting with a shading normal direction. Based on the probability distribution, certain embodiments of the hemispherical clamping system 106 directly sample a pixel of the IBL image corresponding to a specific hemisphere.

As mentioned above, the hemispherical clamping system 106 can accurately and efficiently render digital images. FIGS. 6A-6B illustrate experimental results of implementing the hemispherical clamping system 106 in accordance with one or more embodiments. For example, as shown in FIGS. 6A-6B, the hemispherical clamping system 106 generates the digital images in top rows 602, 606 based on the acts and algorithms disclosed in the present application. In comparison, conventional digital rendering systems generate the digital images in bottom rows 604, 608. In particular, FIG. 6A portrays a comparison of digital images with metallic reflective BSDFs. Additionally, FIG. 6B portrays a comparison of digital images with non-metallic reflective BSDFs.

To generate the digital images in the top rows 602, 606, the hemispherical clamping system 106 incorporated a number of experimental parameters. For example, the hemispherical clamping system 106 sub-divided an IBL image using a block resolution of 64 by 32 blocks, such that an average of 45.6% of pixels in the IBL image were removed from sampling. In addition, the hemispherical clamping system 106 employed a central processing unit (CPU) Monte Carlo renderer to sample a light path comprising first and second ray directions (e.g., as described above in relation to FIG. 3). Further, the hemispherical clamping system 106 utilized a sampling rate of two samples per pixel of the IBL image. Additionally, the experimental results involved using varying surface roughness for the lobes (e.g., that increased in left-to-right fashion).

Based on the experimental results portrayed in the top rows 602, 606 of FIGS. 6A-6B, the hemispherical clamping system 106 has shown to experimentally generate accurate digital images (and with increased efficiency and speed). For example, given a fixed sampling rate, the experimental results indicated reduced variance and consistently improved convergency with different roughness settings.

Figure 7:
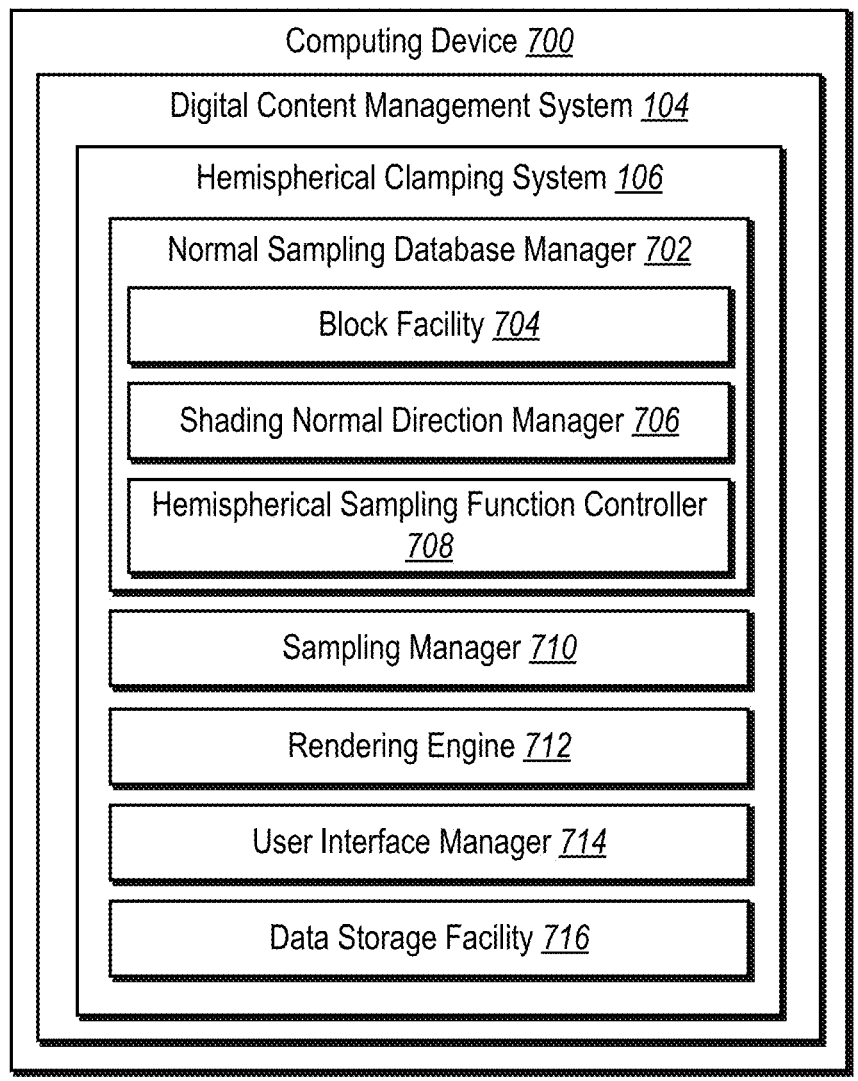
FIG. 7 illustrates an example schematic diagram of a hemispherical clamping system in accordance with one or more embodiments.

Turning to FIG. 7, additional detail will now be provided regarding various components and capabilities of the hemispherical clamping system 106. In particular, FIG. 7 illustrates an example schematic diagram of a computing device 700 (e.g., the server(s) 102 and/or the client device 108) implementing the hemispherical clamping system 106 in accordance with one or more embodiments of the present disclosure. As shown, the hemispherical clamping system 106 is implemented by the digital content management system 104. Also illustrated, the hemispherical clamping system 106 includes a normal sampling database manager 702, a sampling manager 710, a rendering engine 712, a user interface manager 714, and a data storage facility 716.

In one or more embodiments, the normal sampling database manager 702 generates, obtains, transmits, executes, and/or stores elements of a normal sampling database (as described in relation to the foregoing figures). As shown, the normal sampling database manager 702 includes a block facility 704, a shading normal direction manager 706, and a hemispherical sampling function controller 708.

In certain embodiments, the block facility 704 generates, stores, transmits, and/or indexes blocks corresponding to IBL images (as described in relation to the foregoing figures). In particular embodiments, the block facility 704 divides IBL images into blocks. For example, the block facility 704 divides IBL images into rows and columns of blocks. Additionally, in some embodiments, the block facility 704 communicates block-specific information to the shading normal direction manager 706 and the hemispherical sampling function controller 708.

In some embodiments, the shading normal direction manager 706 generates, obtains, transmits, stores, and/or determines shading normal directions for surface points on a virtual object (as described in relation to the foregoing figures). In particular embodiments, the shading normal direction manager 706 communicates with the sampling manager 710 to determine a given surface point on the virtual object. With the given surface point, one or more embodiments of the shading normal direction manager 706 determine a vector path that is perpendicular to a tangent plane at the given surface point. In certain implementations, the shading normal direction manager 706 can transmit the shading normal direction to the block facility 704 for determining which block the shading normal direction intersects.

Additionally, in one or more embodiments, the hemispherical sampling function controller 708 generates, obtains, transmits, stores, and/or executes hemispherical sampling functions for limiting sampling of an IBL image (as described in relation to the foregoing figures). In particular embodiments, the hemispherical sampling function controller 708 communicates with the block facility 704 and the shading normal direction manager 706 to determine a hemispherical mask based on a given block corresponding to a shading normal direction of a surface point. For example, the hemispherical sampling function controller 708 uses the given block to determine and apply a hemispherical mask indicating which other blocks correspond (and/or do not correspond) to a same hemispherical region as the given block. Further, in some embodiments, the hemispherical sampling function controller 708 uses row-sampling functions and column-sampling functions to ultimately identify a specific pixel to sample. For example, the hemispherical sampling function controller 708 uses a row-sampling function corresponding to the above given block for identifying a pixel row in the blocks from which to sample. In turn, one or more embodiments of the hemispherical sampling function controller 708 use a column-sampling function corresponding to an identified row of pixels to identify a particular pixel within a specific pixel column given the particular row pixels from which to sample.

In one or more embodiments, the sampling manager 710 samples ray directions and light paths (as described in relation to the foregoing figures). In particular embodiments, the sampling manager 710 uses a Monte Carlo camera importance sampling function to sample initial ray directions (e.g., between a camera perspective and a surface point of a virtual object). Additionally, in certain implementations, the sampling manager 710 communicates with the hemispherical sampling function controller 708 to identify which pixel of the IBL image that the sampling manager 710 is to sample. Based on the identified pixel, one or more embodiments of the sampling manager 710 sample a ray direction between the surface point of the virtual object and the identified pixel.

In some embodiments, the rendering engine 712 generates a digital image of a virtual environment (as described in relation to the foregoing figures). In particular embodiments, the rendering engine 712 utilizes a combination of sampled ray directions to render a ray following a light path between a camera perspective and the IBL image along the combination of sampled ray directions and the surface point of the virtual object. In at least some embodiments, the rendering engine 712 communicates with the user interface manager 714 for displaying a rendered digital image.

In one or more embodiments, the user interface manager 714 provides, manages, and/or controls a graphical user interface (or simply "user interface"). In particular embodiments, the user interface manager 714 generates and displays a user interface by way of a display screen composed of a plurality of graphical components, objects, and/or elements that allow a user to perform a function. For example, the user interface manager 714 receives user inputs from a user, such as a click/tap to view, interact with, or transmit a digital image of a virtual environment. Additionally, in one or more embodiments, the user interface manager 714 presents a variety of types of information, including text, rendered digital images, or other information for presentation in a user interface.

The data storage facility 716 maintains data for the hemispherical clamping system 106. The data storage facility 716 (e.g., via one or more memory devices) maintains data of any type, size, or kind, as necessary to perform the functions of the hemispherical clamping system 106. For example, the data storage facility 716 stores IBL images, virtual objects, virtual environments, digital images (e.g., rendered digital images), and/or a normal sampling database (e.g., in connection with or else independent from the normal sampling database manager 702).

Each of the components of the computing device 700 can include software, hardware, or both. For example, the components of the computing device 700 can include one or more instructions stored on a computer-readable storage medium and executable by processors of one or more computing devices, such as a client device or server device. When executed by the one or more processors, the computer-executable instructions of the hemispherical clamping system 106 can cause the computing device(s) (e.g., the computing device 700) to perform the methods described herein. Alternatively, the components of the computing device 700 can include hardware, such as a special-purpose processing device to perform a certain function or group of functions. Alternatively, the components of the computing device 700 can include a combination of computer-executable instructions and hardware.

Furthermore, the components of the computing device 700 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 700 may be implemented as a stand-alone application, such as a desktop or mobile application. Furthermore, the components of the computing device 700 may be implemented as one or more web-based applications hosted on a remote server.

The components of the computing device 700 may also be implemented in a suite of mobile device applications or "apps." To illustrate, the components of the computing device 700 may be implemented in an application, including but not limited to ILLUSTRATOR®, PHOTOSHOP®, PHOTOSHOP® ELEMENTS, LIGHTROOM®, LIGHTROOM® FOR MOBILE, ADOBE® PREMIERE®, ADOBE® PREMIERE® PRO, or ADOBE® PREMIERE® ELEMENTS. Product names, including "ADOBE" and any other portion of one or more of the foregoing product names, may include registered trademarks or trademarks of Adobe Inc. in the United States and/or other countries.

Figure 8:
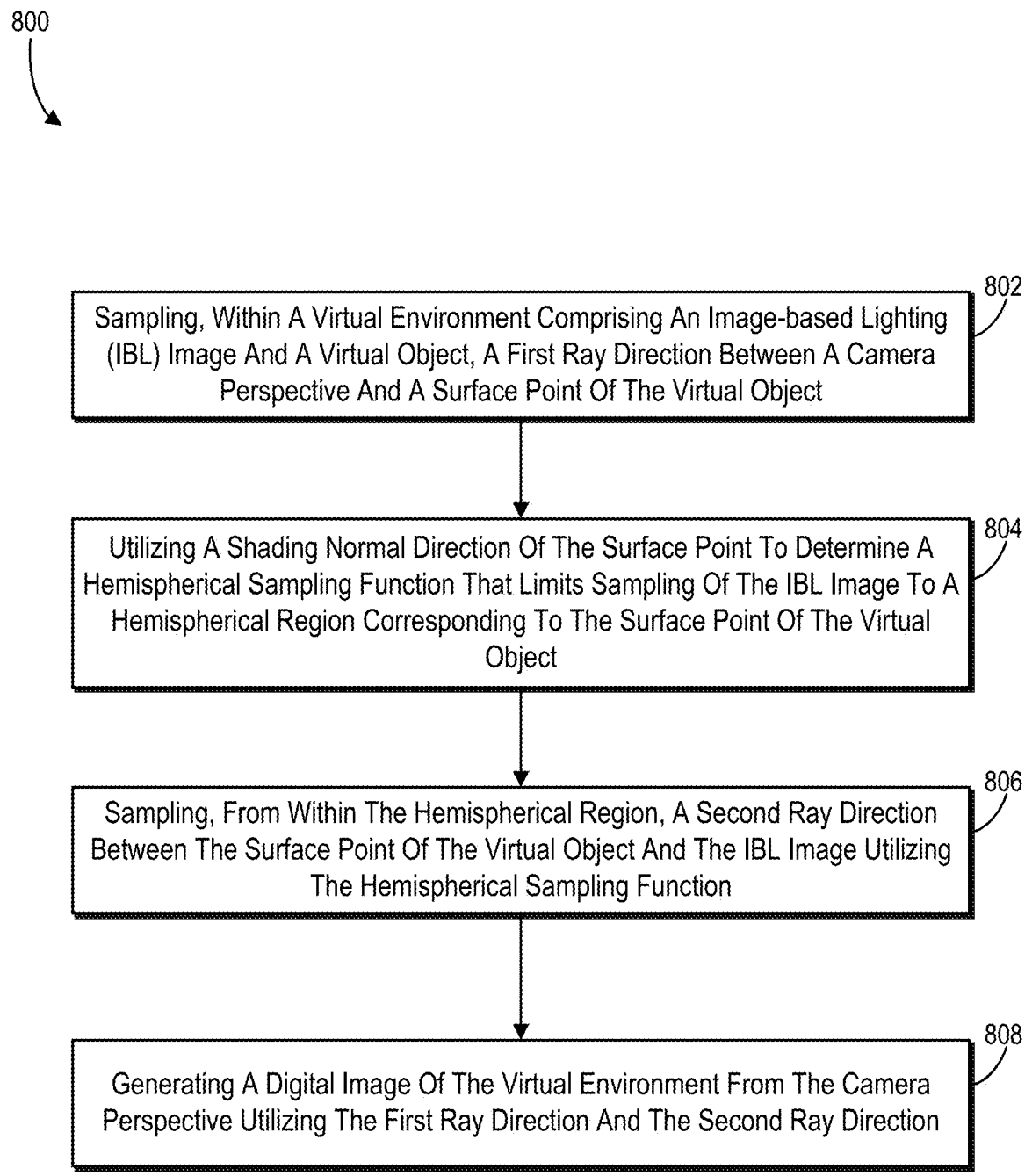
FIG. 8 illustrates a flowchart of a series of acts for generating a digital image of a virtual environment in accordance with one or more embodiments.

FIGS. 1-7, the corresponding text, and the examples provide several different systems, methods, techniques, components, and/or devices of the hemispherical clamping system 106 in accordance with one or more embodiments. In addition to the above description, one or more embodiments can also be described in terms of flowcharts including acts for accomplishing a particular result. For example, FIG. 8 illustrates a flowchart of a series of acts 800 for generating a digital image of a virtual environment in accordance with one or more embodiments. The hemispherical clamping system 106 may perform one or more acts of the series of acts 800 in addition to or alternatively to one or more acts described in conjunction with other figures. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown, the series of acts 800 includes an act 802 of sampling, within a virtual environment comprising an image-based lighting (IBL) image and a virtual object, a first ray direction intersecting a surface point of the virtual object. In some embodiments, the IBL image comprises pixels indicating incidental directional radiance of the virtual environment. Further, in certain implementations, sampling the first ray direction comprises utilizing a Monte Carlo camera importance sampling function.

The series of acts 800 also includes an act 804 of utilizing a shading normal direction of the surface point to determine a hemispherical sampling function that limits sampling of the IBL image to a hemispherical region corresponding to the surface point of the virtual object. In some embodiments, utilizing the shading normal direction of the surface point to determine the hemispherical sampling function comprises: determining a block in the normal sampling database that corresponds to the shading normal direction for the surface point; and identifying the hemispherical sampling function corresponding to the block in the normal sampling database. Additionally or alternatively, utilizing the hemispherical sampling function of the determined block to limit sampling of the IBL image comprises excluding pixels of other blocks of the IBL image that do not fall within the hemispherical region.

In certain implementations, utilizing the shading normal direction of the surface point to determine the hemispherical sampling function comprises: utilizing the shading normal direction to select a hemispherical mask and a row-sampling function from the plurality of row-sampling functions; sampling a row of the IBL image utilizing the row-sampling function and the hemispherical mask; and sampling a pixel from the row of the IBL image utilizing the hemispherical mask and a column-sampling function from the plurality of column-sampling functions.

In addition, the series of acts 800 includes an act 806 of sampling, from within the hemispherical region, a second ray direction between the surface point of the virtual object and the IBL image utilizing the hemispherical sampling function.

The series of acts 800 further includes an act 808 of generating a digital image of the virtual environment from the camera perspective utilizing the first ray direction and the second ray direction. In some embodiments, generating the digital image of the virtual environment from the camera perspective utilizing the first ray direction and the second ray direction comprises rendering a ray following a light path between the camera perspective and the IBL image along the first ray direction, the surface point, and the second ray direction. In certain implementations, the first ray direction is between the camera perspective and the surface point of the virtual object. Accordingly, in some embodiments, generating the digital image of the virtual environment comprises utilizing a central processing unit Monte Carlo renderer to render a ray following a light path between the camera perspective and the IBL image along the first ray direction, the surface point, and the second ray direction.

It is understood that the outlined acts in the series of acts 800 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 8, act(s) in the series of acts 800 may include an act of: sampling, within the virtual environment, a third ray direction intersecting an additional surface point of the virtual object; and utilizing an additional shading normal direction of the additional surface point to determine an additional hemispherical sampling function that limits sampling of the IBL image to an additional hemispherical region corresponding to the additional surface point of the virtual object.

As another example of an additional act not shown in FIG. 8, act(s) in the series of acts 800 may include an act of: sampling, from within the additional hemispherical region, a fourth ray direction between the additional surface point of the virtual object and the IBL image utilizing the additional hemispherical sampling function; and generating the digital image of the virtual environment from the camera perspective additionally utilizing the third ray direction and the fourth ray direction.

In yet another example of an additional act not shown in FIG. 8, act(s) in the series of acts 800 may include an act of: dividing the pixels of the IBL image into a plurality of blocks corresponding to a plurality of shading normal directions; and generating a normal sampling database comprising a plurality of hemispherical sampling functions corresponding to the plurality of blocks.

As a further example of an additional act not shown in FIG. 8, act(s) in the series of acts 800 may include an act of generating the normal sampling database comprising the plurality of hemispherical sampling functions by: generating a plurality of row-sampling functions for the plurality of blocks; and generating a plurality of column-sampling functions.

As an additional example of an act not shown in FIG. 8, act(s) in the series of acts 800 may include an act of: determining a block in the normal sampling database that corresponds to a shading normal direction of a surface point of the virtual object; determining, based on the block, a hemispherical sampling function that limits sampling of the IBL image to a hemispherical region corresponding to the surface point of the virtual object; and generating a digital image of the virtual environment by sampling, from within the hemispherical region, a ray direction between the surface point of the virtual object and the IBL image utilizing the hemispherical sampling function.

As one example of an additional act not shown in FIG. 8, act(s) in the series of acts 800 may include an act of: determining an additional block in the normal sampling database that corresponds to an additional shading normal direction of an additional surface point of the virtual object; determining, based on the additional block, an additional hemispherical sampling function that limits sampling of the IBL image to an additional hemispherical region corresponding to the additional surface point of the virtual object; and generating the digital image of the virtual environment by sampling, from within the additional hemispherical region, another ray direction between the additional surface point of the virtual object and the IBL image utilizing the additional hemispherical sampling function.

As another example of an additional act not shown in FIG. 8, act(s) in the series of acts 800 may include an act of determining the block in the normal sampling database that corresponds to the shading normal direction at the surface point of the virtual object by determining that the shading normal direction falls within a range of shading normal directions corresponding to the block.

In yet another example of an additional act not shown in FIG. 8, act(s) in the series of acts 800 may include an act of utilizing the hemispherical sampling function for limiting sampling of the IBL image by applying, based on the determined block, a hemispherical mask to the IBL image to exclude pixels of particular blocks of the plurality of blocks that do not correspond to the hemispherical region.

Still further, in another example of an additional act not shown in FIG. 8, act(s) in the series of acts 800 may include an act of sampling the ray direction between the surface point of the virtual object and the IBL image by: sampling a row of the IBL image utilizing the hemispherical mask and a row-sampling function, the row-sampling function representing a probability distribution of sampling rows of pixels of the IBL image; and sampling a pixel from the row of the IBL image utilizing the hemispherical mask and a column-sampling function, the column-sampling function representing a probability distribution of sampling columns of pixels of the IBL image given a particular row of pixels.

Additionally, in another example of an act not shown in FIG. 8, act(s) in the series of acts 800 may include an act of generating the normal sampling database comprising the plurality of hemispherical sampling functions by: generating a plurality of row-sampling functions for the plurality of blocks; generating a plurality of column-sampling functions for corresponding pixel rows; and generating a plurality of hemispherical masks for the plurality of blocks of the IBL image, each hemispherical mask of the plurality of hemispherical masks identifying blocks of the plurality of blocks that correspond to a particular hemispherical region for a particular shading normal direction.

As another example of an act not shown in FIG. 8, act(s) in the series of acts 800 may include an act of generating a hemispherical mask for a block corresponding to a shading normal direction by, for each row of blocks in the plurality of blocks, storing a two-dimensional block range identifying the blocks corresponding to the hemispherical region.

In addition (or in the alternative) to the acts described above, in some embodiments, the series of acts 800 can include performing a step for sampling a second ray direction from within a hemispherical region of the IBL image corresponding to a shading normal direction of the surface point. For instance, the acts and algorithms described above in relation to FIGS. 5A-5B can comprise the corresponding acts (or structure) for performing a step for sampling a second ray direction from within a hemispherical region of the IBL image corresponding to a shading normal direction of the surface point.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
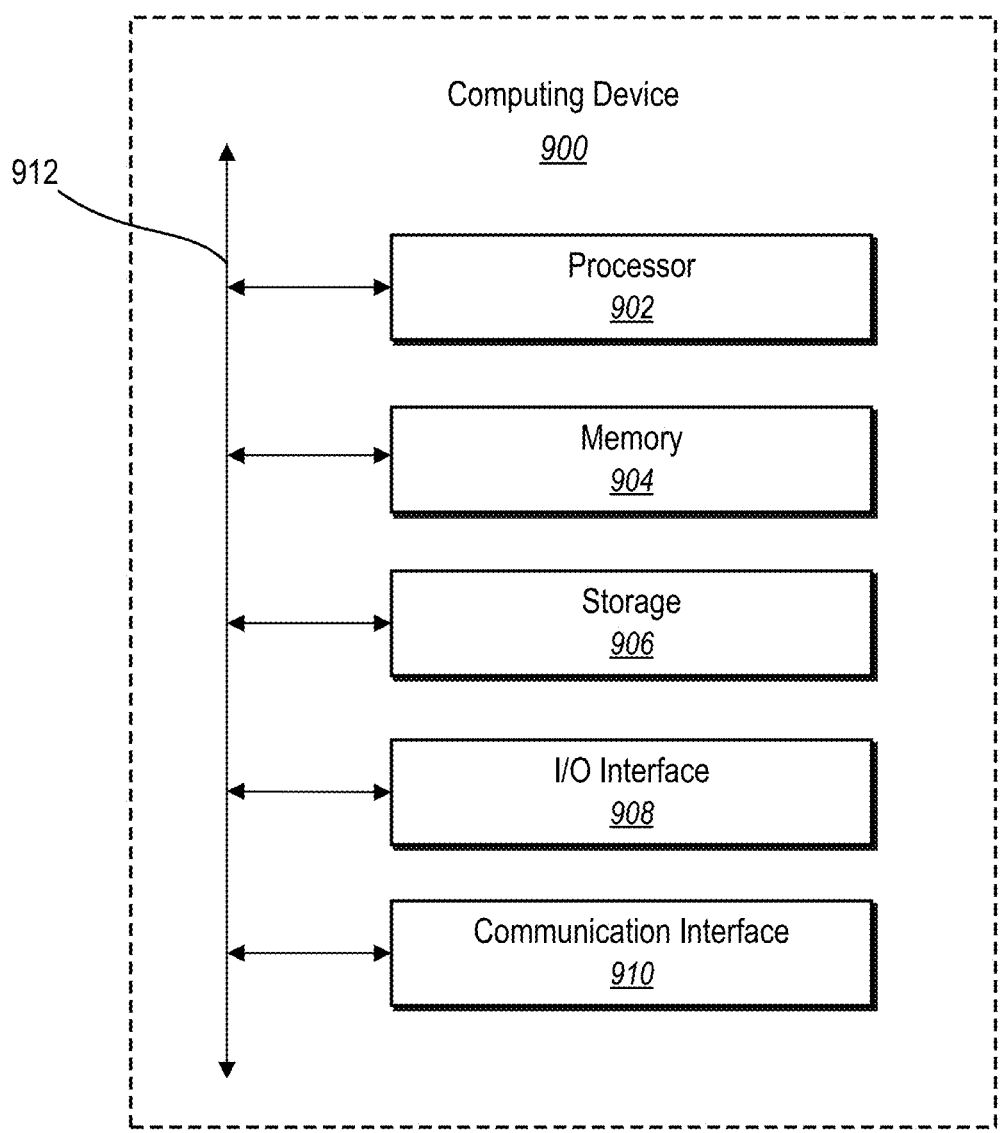
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102, the client device 108, and/or the computing device 700). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of the computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:
    sample, within a virtual environment comprising an image-based lighting (IBL) image and a virtual object, a first ray direction intersecting a first surface point of the virtual object and a second ray direction intersecting a second surface point of the virtual object;
    utilize a first shading normal direction of the first surface point to determine a first hemispherical sampling function that limits sampling of the IBL image to a first hemispherical region corresponding to the first surface point of the virtual object, wherein the first hemispherical sampling function comprises a first probability distribution of sampling pixels of the IBL image within the first hemispherical region;
    utilize a second shading normal direction of the second surface point to determine a second hemispherical sampling function that limits sampling of the IBL image to a second hemispherical region corresponding to the second surface point of the virtual object, wherein the second hemispherical sampling function comprises a second probability distribution of sampling pixels of the IBL image within the second hemispherical region;
    sample, from within the first hemispherical region, a third ray direction between the first surface point of the virtual object and the IBL image utilizing the first hemispherical sampling function;
    sample, from within the second hemispherical region, a fourth ray direction between the second surface point of the virtual object and the IBL image utilizing the second hemispherical sampling function; and
    generate a digital image of the virtual environment from a camera perspective utilizing the first ray direction, the second ray direction, the third ray direction, and the fourth ray direction.

2. The non-transitory computer-readable storage medium of claim 1, wherein the IBL image comprises pixels indicating incidental directional radiance of the virtual environment and further comprising instructions that, when executed by the at least one processor, cause the computing device to:
divide the pixels of the IBL image into a plurality of blocks corresponding to a plurality of shading normal directions; and
generate a normal sampling database comprising a plurality of hemispherical sampling functions corresponding to the plurality of blocks.

3. The non-transitory computer-readable storage medium of claim 2, further comprising instructions that, when executed by the at least one processor, cause the computing device to utilize the first shading normal direction of the first surface point to determine the first hemispherical sampling function by:
determining a first block in the normal sampling database that corresponds to the first shading normal direction for the first surface point; and
identifying the first hemispherical sampling function corresponding to the first block in the normal sampling database.

4. The non-transitory computer-readable storage medium of claim 3, further comprising instructions that, when executed by the at least one processor, cause the computing device to utilize the first hemispherical sampling function corresponding to the first block in the normal sampling database to limit sampling of the IBL image by excluding pixels of other blocks of the IBL image that do not fall within the first hemispherical region.

5. The non-transitory computer-readable storage medium of claim 2, further comprising instructions that, when executed by the at least one processor, cause the computing device to generate the normal sampling database comprising the plurality of hemispherical sampling functions by:
generating a plurality of row-sampling functions for the plurality of blocks; and
generating a plurality of column-sampling functions.

6. The non-transitory computer-readable storage medium of claim 5, further comprising instructions that, when executed by the at least one processor, cause the computing device to utilize the first shading normal direction of the first surface point to determine the first hemispherical sampling function by:
utilizing the first shading normal direction to select a first hemispherical mask and a first row-sampling function from the plurality of row-sampling functions;
sampling a row of the IBL image utilizing the first row-sampling function and the first hemispherical mask; and
sampling a pixel from the row of the IBL image utilizing the first hemispherical mask and a first column-sampling function from the plurality of column-sampling functions.

7. The non-transitory computer-readable storage medium of claim 1, further comprising instructions that, when executed by the at least one processor, cause the computing device to generate the digital image of the virtual environment from the camera perspective utilizing the first ray direction, the second ray direction, the third ray direction, and the fourth ray direction by:
rendering a first ray following a first light path between the camera perspective and the IBL image along the first ray direction, the first surface point, and the third ray direction; and
rendering a second ray following a second light path between the camera perspective and the IBL image along the second ray direction, the second surface point, and the fourth ray direction.

8. The non-transitory computer-readable storage medium of claim 1, further comprising instructions that, when executed by the at least one processor, cause the computing device to sample the first ray direction utilizing a Monte Carlo camera importance sampling function.

9. A system comprising:
one or more memory devices comprising:
an image-based lighting (IBL) image and a virtual object of a virtual environment; and
a normal sampling database that comprises a plurality of hemispherical sampling functions corresponding to a plurality of blocks subdividing the IBL image; and
one or more processors configured to cause the system to:
determine a first block in the normal sampling database that corresponds to a first shading normal direction of a first surface point of the virtual object;
determine, based on the first block, a first hemispherical sampling function that limits sampling of the IBL image to a first hemispherical region corresponding to the first surface point of the virtual object, wherein the first hemispherical sampling function comprises a first probability distribution of sampling pixels of the IBL image within the first hemispherical region;
determine a second block in the normal sampling database that corresponds to a second shading normal direction of a second surface point of the virtual object;
determine, based on the second block, a second hemispherical sampling function that limits sampling of the IBL image to a second hemispherical region corresponding to the second surface point of the virtual object, wherein the second hemispherical sampling function comprises a second probability distribution of sampling pixels of the IBL image within the second hemispherical region; and
generate a digital image of the virtual environment by:
sampling, from within the first hemispherical region, a first ray direction between the first surface point of the virtual object and the IBL image utilizing the first hemispherical sampling function; and
sampling, from within the second hemispherical region, a second ray direction between the second surface point of the virtual object and the IBL image utilizing the second hemispherical sampling function.

10. The system of claim 9, wherein the one or more processors are configured to cause the system to determine the first block in the normal sampling database that corresponds to the first shading normal direction of the first surface point of the virtual object by determining that the first shading normal direction falls within a range of shading normal directions corresponding to the first block.

11. The system of claim 9, wherein the one or more processors are configured to cause the system to utilize the first hemispherical sampling function for limiting sampling of the IBL image by applying, based on the determined first block, a first hemispherical mask to the IBL image to exclude pixels of particular blocks of the plurality of blocks that do not correspond to the first hemispherical region.

12. The system of claim 11, wherein the one or more processors are configured to cause the system to sample the first ray direction between the first surface point of the virtual object and the IBL image by:
   sampling a row of the IBL image utilizing the first hemispherical mask and a first row-sampling function, the first row-sampling function representing a first probability distribution of sampling rows of pixels of the IBL image; and
   sampling a pixel from the row of the IBL image utilizing the first hemispherical mask and a first column-sampling function, the first column-sampling function representing a second probability distribution of sampling columns of pixels of the IBL image given a particular row.

13. The system of claim 9, wherein the one or more processors are configured to cause the system to generate the digital image of the virtual environment by:
   sampling an initial ray direction between a camera perspective and the first surface point of the virtual object by utilizing a Monte Carlo camera importance sampling function; and
   rendering a ray following a light path between the camera perspective and the IBL image along the initial ray direction, the first surface point, and the first ray direction.

14. The system of claim 9, wherein the one or more processors are configured to cause the system to generate the normal sampling database comprising the plurality of hemispherical sampling functions by:
   generating a plurality of row-sampling functions for the plurality of blocks;
   generating a plurality of column-sampling functions for corresponding rows; and
   generating a plurality of hemispherical masks for the plurality of blocks of the IBL image, each hemispherical mask of the plurality of hemispherical masks identifying blocks of the plurality of blocks that correspond to a particular hemispherical region for a particular shading normal direction.

15. The system of claim 14, wherein the one or more processors are configured to cause the system to generate a hemispherical mask for a block corresponding to a shading normal direction by, for each row of blocks in the plurality of blocks, storing a two-dimensional block range identifying the blocks corresponding to a hemispherical region.

16. A computer-implemented method comprising:
   sampling, within a virtual environment comprising an image-based lighting (IBL) image and a virtual object, a first ray direction intersecting a first surface point of the virtual object and a second ray direction intersecting a second surface point of the virtual object;
   utilizing a first shading normal direction of the first surface point to determine a first hemispherical sampling function that limits sampling of the IBL image to a first hemispherical region corresponding to the first surface point of the virtual object, wherein the first hemispherical sampling function comprises a first probability distribution of sampling pixels of the IBL image within the first hemispherical region;
   utilizing a second shading normal direction of the second surface point to determine a second hemispherical sampling function that limits sampling of the IBL image to a second hemispherical region corresponding to the second surface point of the virtual object, wherein the second hemispherical sampling function comprises a second probability distribution of sampling pixels of the IBL image within the second hemispherical region;
   sampling, from within the first hemispherical region, a third ray direction between the first surface point of the virtual object and the IBL image utilizing the first hemispherical sampling function;
   sampling, from within the second hemispherical region, a fourth ray direction between the second surface point of the virtual object and the IBL image utilizing the second hemispherical sampling function; and
   generating a digital image of the virtual environment from a camera perspective utilizing the first ray direction, the second ray direction, the third ray direction, and the fourth ray direction.

17. The computer-implemented method of claim 16, wherein:
   the first ray direction is between the camera perspective and the first surface point of the virtual object; and
   generating the digital image of the virtual environment comprises utilizing a central processing unit Monte Carlo renderer to render a ray following a light path between the camera perspective and the IBL image along the first ray direction, the first surface point, and the second third ray direction.

18. The computer-implemented method of claim 16, further comprising:
   dividing pixels of the IBL image into a plurality of blocks corresponding to a plurality of shading normal directions, wherein the pixels of the IBL image indicate incidental directional radiance of the virtual environment; and
   generating a normal sampling database comprising a plurality of hemispherical sampling functions corresponding to the plurality of blocks.

19. The computer-implemented method of claim 18, further comprising utilizing the first shading normal direction of the first surface point to determine the first hemispherical sampling function by:
   determining a first block in the normal sampling database that corresponds to the first shading normal direction for the first surface point; and
   identifying the first hemispherical sampling function corresponding to the first block in the normal sampling database.

20. The computer-implemented method of claim 19, further comprising utilizing the first hemispherical sampling function corresponding to the first block in the normal sampling database to limit sampling of the IBL image by excluding pixels of other blocks of the IBL image that do not fall within the first hemispherical region.

* * * * *